United States Patent
Ehmann et al.

(10) Patent No.: US 10,911,783 B2
(45) Date of Patent: Feb. 2, 2021

(54) METHOD AND APPARATUS FOR PROCESSING VIDEO SIGNAL USING COEFFICIENT-INDUCED RECONSTRUCTION

(71) Applicant: LG Electronics Inc., Seoul (KR)

(72) Inventors: Jana Ehmann, San Jose, CA (US); Onur G. Guleryuz, San Jose, CA (US)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/301,078

(22) PCT Filed: May 12, 2017

(86) PCT No.: PCT/KR2017/004950
§ 371 (c)(1),
(2) Date: Nov. 13, 2018

(87) PCT Pub. No.: WO2017/196128
PCT Pub. Date: Nov. 16, 2017

(65) Prior Publication Data
US 2019/0191185 A1    Jun. 20, 2019

Related U.S. Application Data

(60) Provisional application No. 62/335,629, filed on May 12, 2016.

(51) Int. Cl.
*H04N 19/61*    (2014.01)
*H04N 19/176*    (2014.01)
(Continued)

(52) U.S. Cl.
CPC ........... *H04N 19/61* (2014.11); *H04N 19/124* (2014.11); *H04N 19/126* (2014.11); *H04N 19/13* (2014.11);
(Continued)

(58) Field of Classification Search
None
See application file for complete search history.

(56) References Cited

U.S. PATENT DOCUMENTS

2011/0235717 A1*   9/2011   Guleryuz ............. H04N 19/192
                                                                    375/240.16
2013/0272390 A1*   10/2013   Joshi ..................... H04N 19/176
                                                                    375/240.03
(Continued)

FOREIGN PATENT DOCUMENTS

KR    20120100836    9/2012
KR    20160031532    3/2016
(Continued)

*Primary Examiner* — Kate H Luo
(74) *Attorney, Agent, or Firm* — Fish & Richardson P.C.

(57) ABSTRACT

Disclosed is a method allowing enhanced prediction of a video signal, the method comprising the steps of: entropy-decoding a neighboring block adjacent to a target block; inverse-quantizing the entropy-decoded neighboring block; acquiring the modified neighboring block by carrying out a modified inverse transform on an inverse-quantized transform coefficient vector of the neighboring block; and generating a prediction block for the target block based on the modified neighboring block, wherein the modified inverse transform applies a different scaling matrix for each pixel location reconstructed for the inverse-quantized transform coefficient vector of the neighboring block.

20 Claims, 19 Drawing Sheets

(51) Int. Cl.
*H04N 19/13* (2014.01)
*H04N 19/124* (2014.01)
*H04N 19/70* (2014.01)
*H04N 19/182* (2014.01)
*H04N 19/18* (2014.01)
*H04N 19/126* (2014.01)
*H04N 19/157* (2014.01)
*H04N 19/593* (2014.01)
*H04N 19/46* (2014.01)

(52) U.S. Cl.
CPC ......... *H04N 19/157* (2014.11); *H04N 19/176* (2014.11); *H04N 19/18* (2014.11); *H04N 19/182* (2014.11); *H04N 19/46* (2014.11); *H04N 19/593* (2014.11); *H04N 19/70* (2014.11)

(56) References Cited

U.S. PATENT DOCUMENTS

| | | | |
|---|---|---|---|
| 2014/0112387 A1 | 4/2014 | Ye et al. | |
| 2015/0172661 A1* | 6/2015 | Dong | H04N 19/13 |
| | | | 375/240.03 |
| 2015/0373327 A1* | 12/2015 | Zhang | H04N 19/157 |
| | | | 375/240.03 |
| 2016/0100168 A1* | 4/2016 | Rapaka | H04N 19/176 |
| | | | 375/240.03 |
| 2017/0150183 A1* | 5/2017 | Zhang | H04N 19/573 |
| 2017/0150186 A1* | 5/2017 | Zhang | H04N 19/573 |
| 2018/0176582 A1* | 6/2018 | Zhao | H04N 19/124 |

FOREIGN PATENT DOCUMENTS

| | | |
|---|---|---|
| KR | 20160040486 | 4/2016 |
| WO | 2008006829 | 1/2008 |

\* cited by examiner

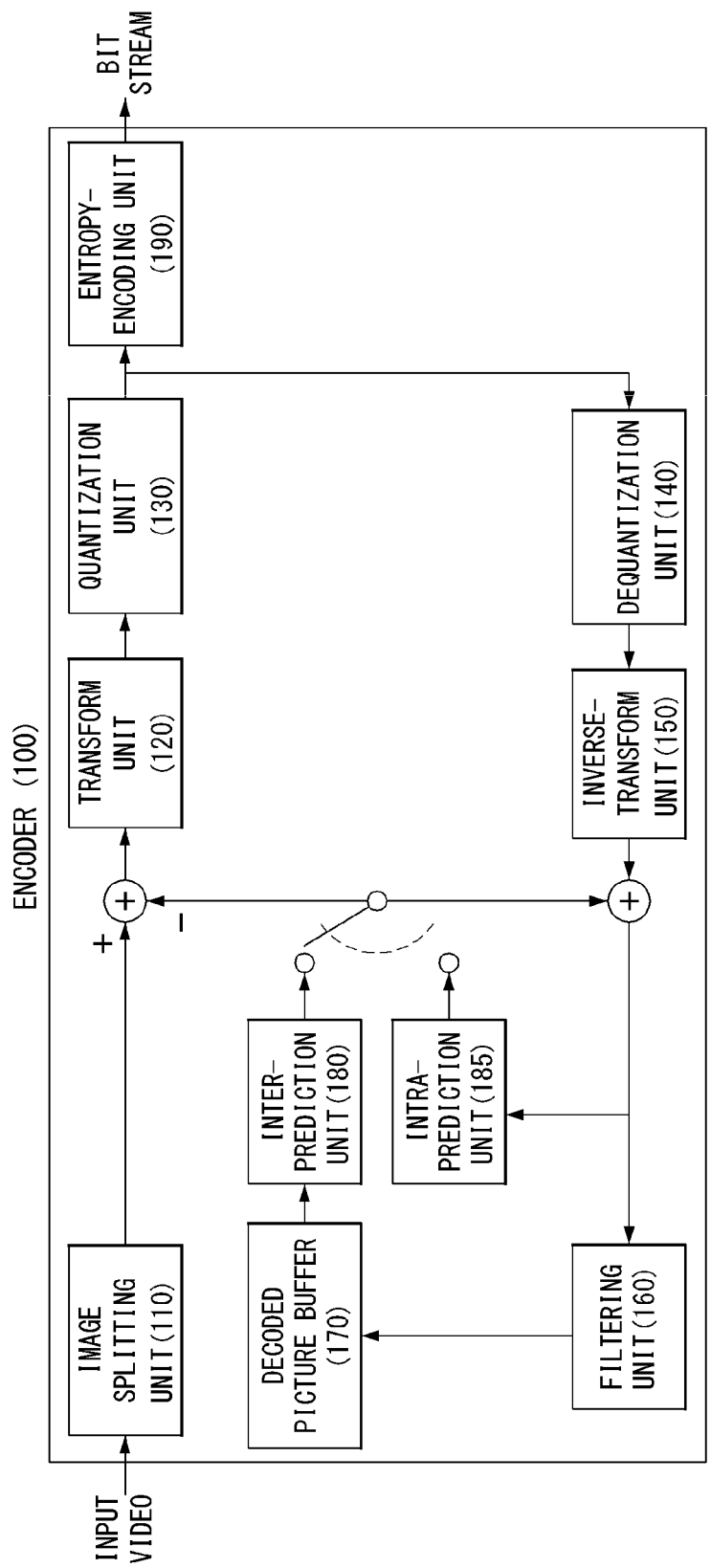
[FIG. 1]

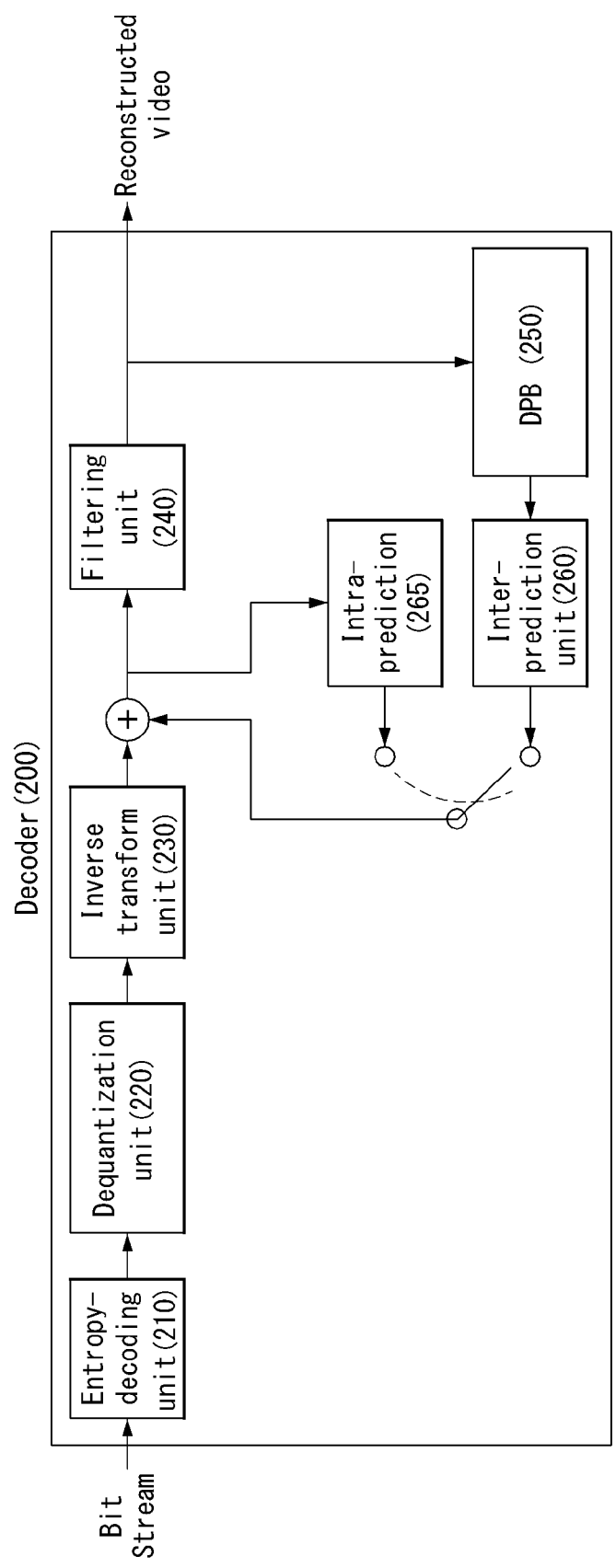
[FIG. 2]

[FIG. 3]
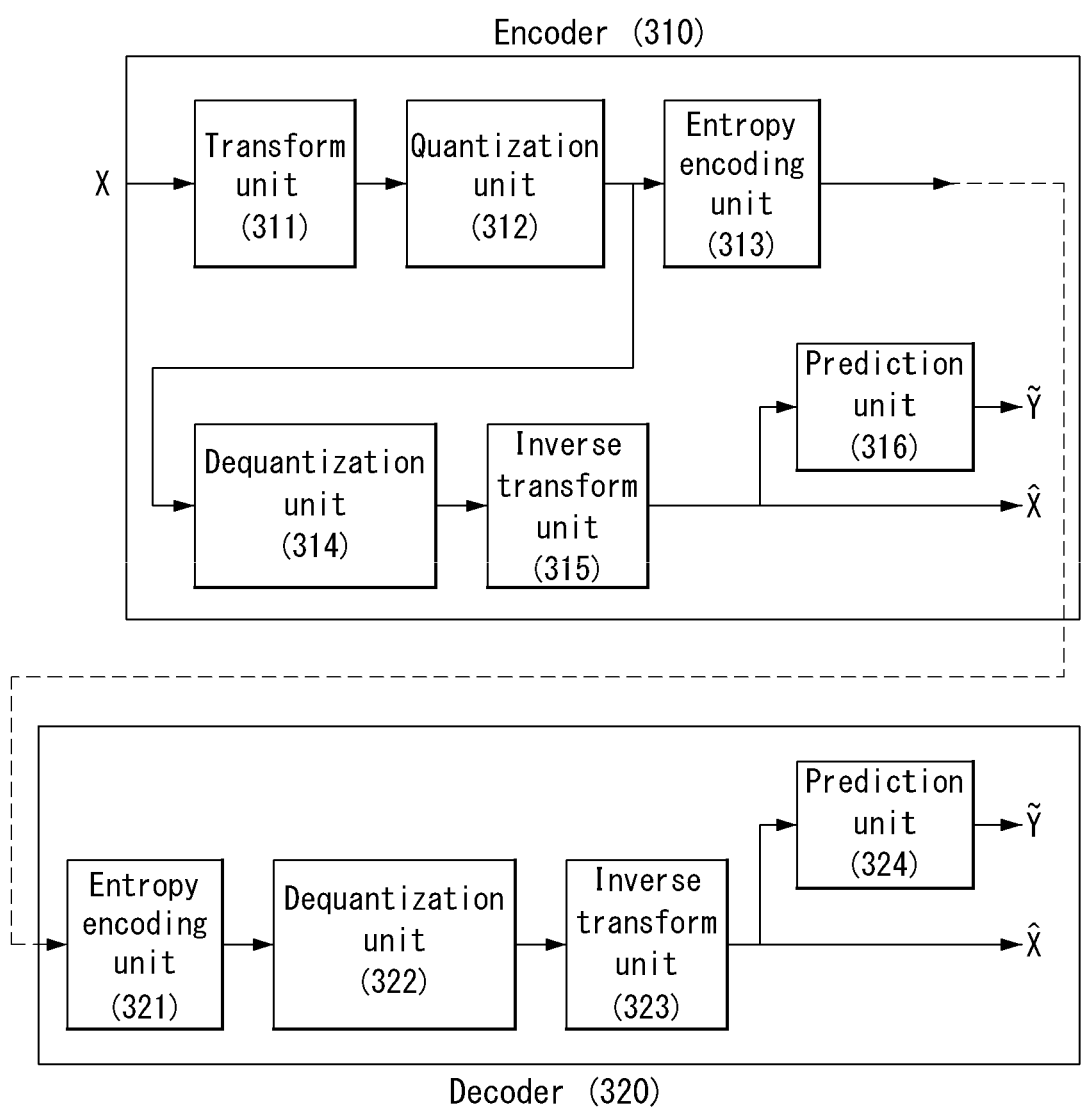

[FIG. 4]
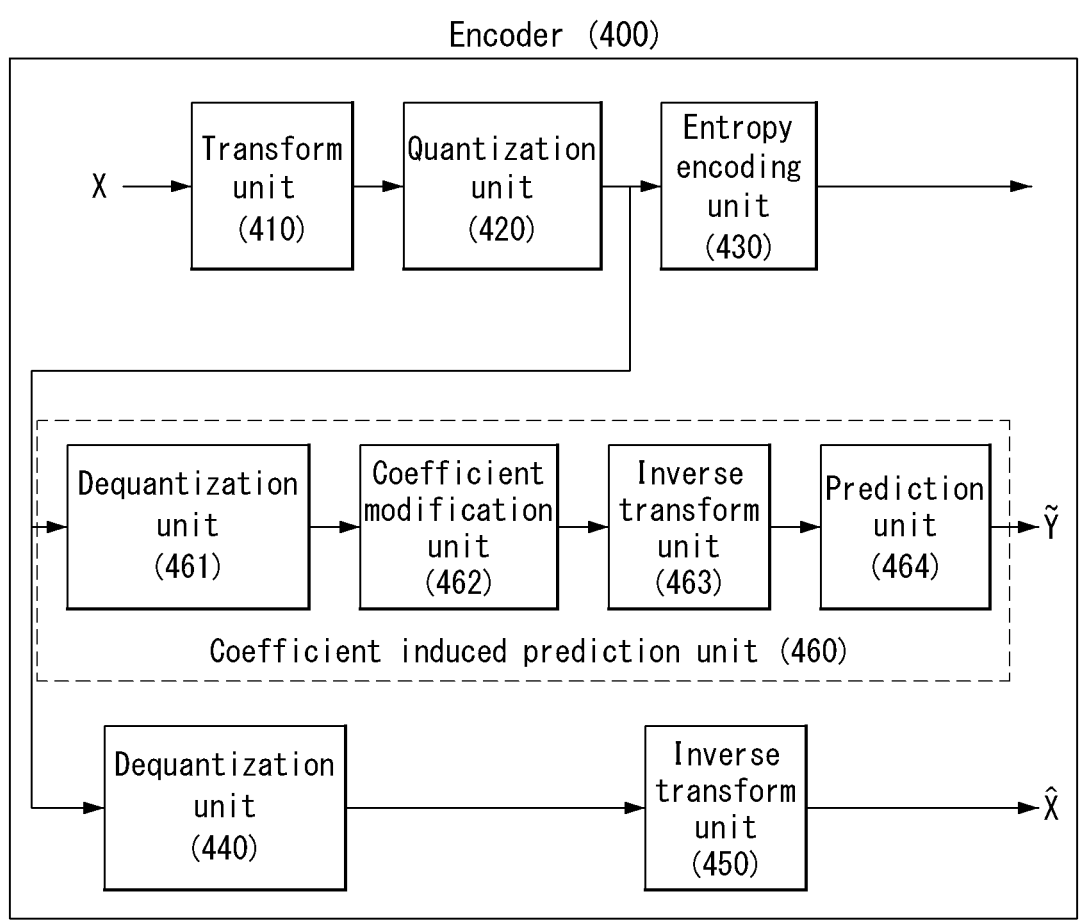

[FIG. 5]
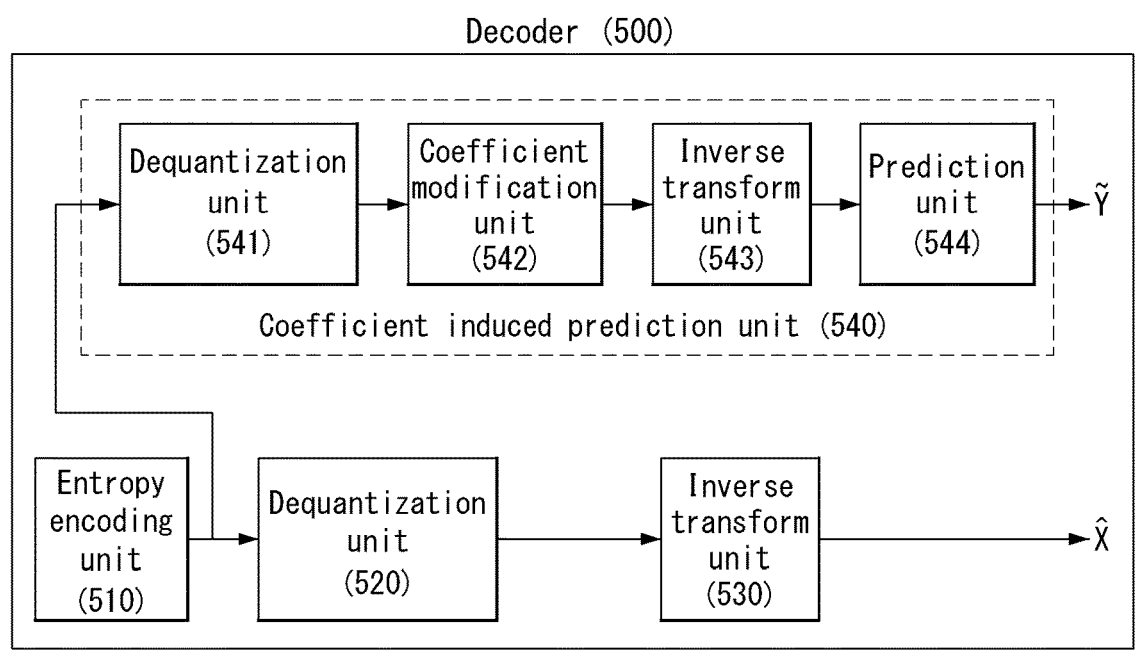

[FIG. 6]
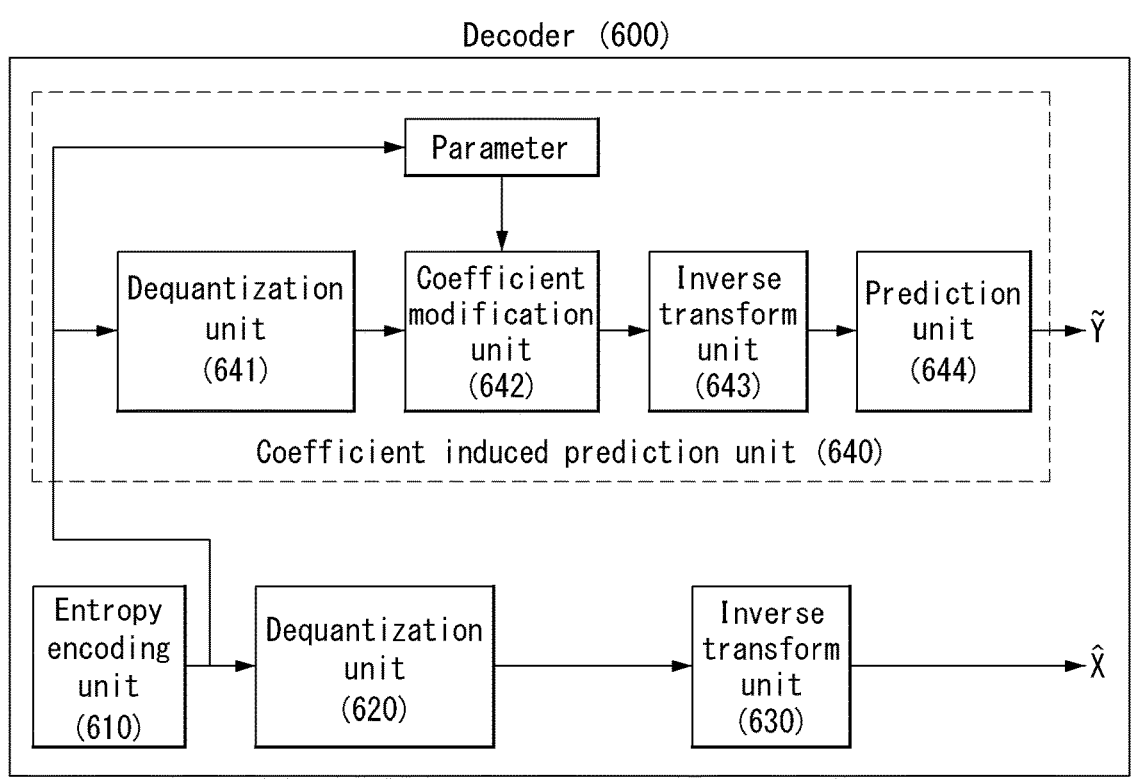

[FIG. 7]
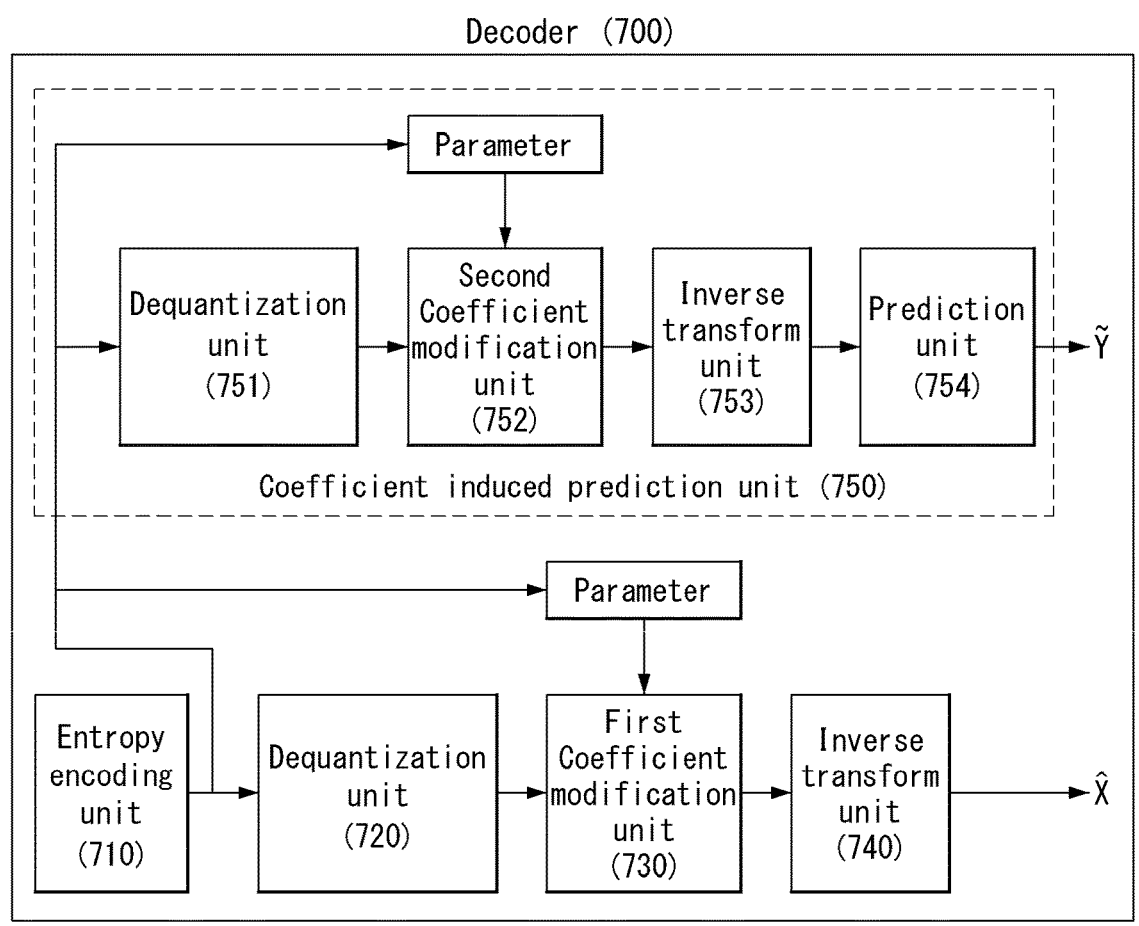

[FIG. 8]
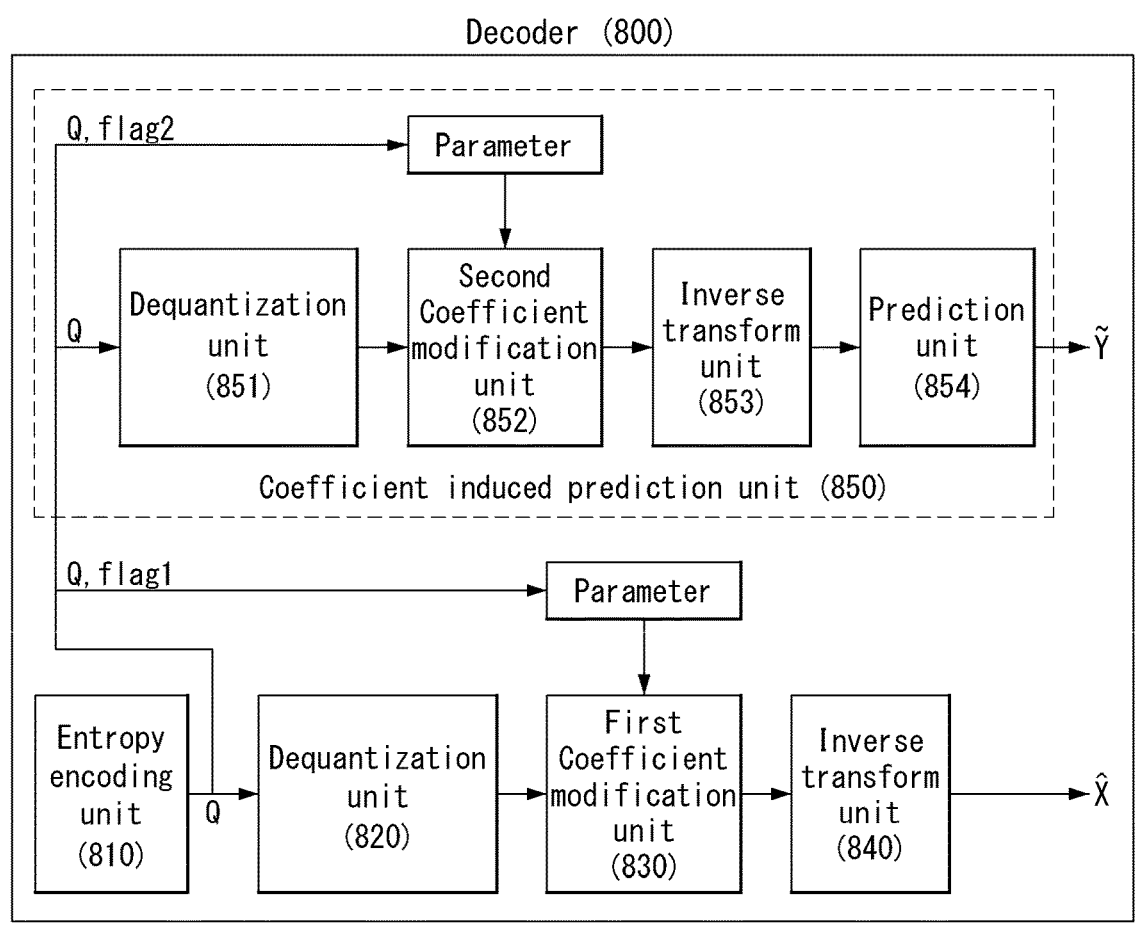

[FIG. 9]
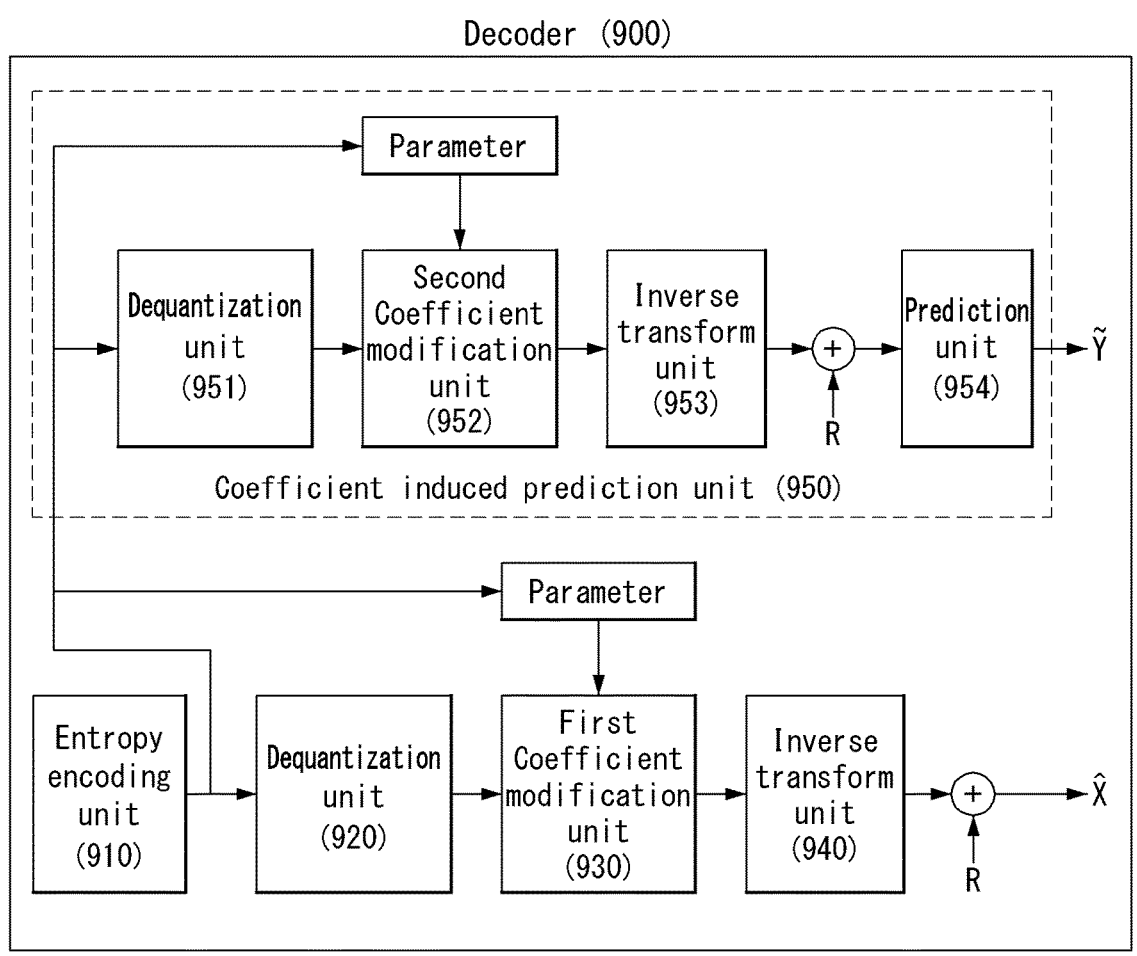

[FIG. 10]
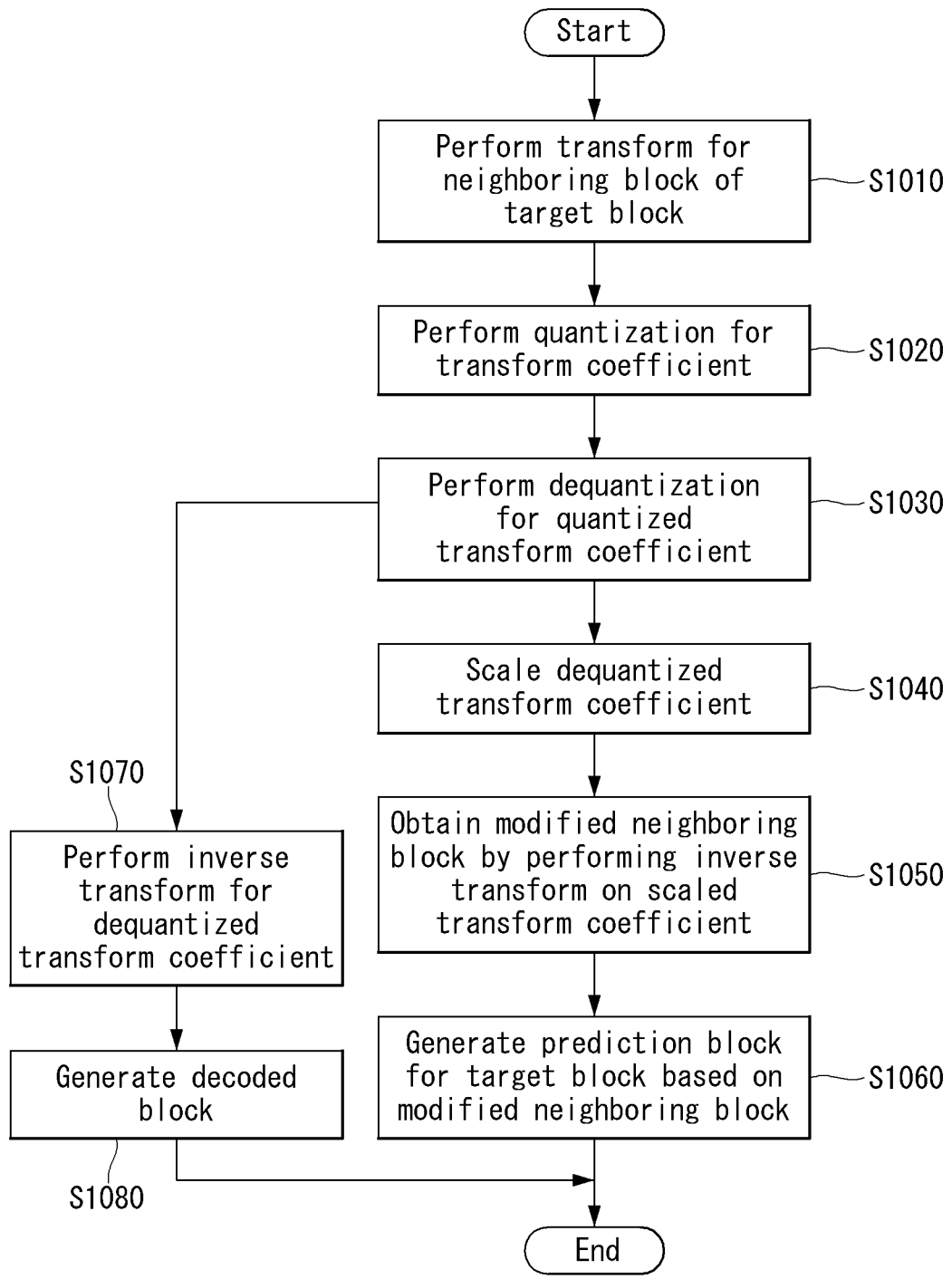

[FIG. 11]
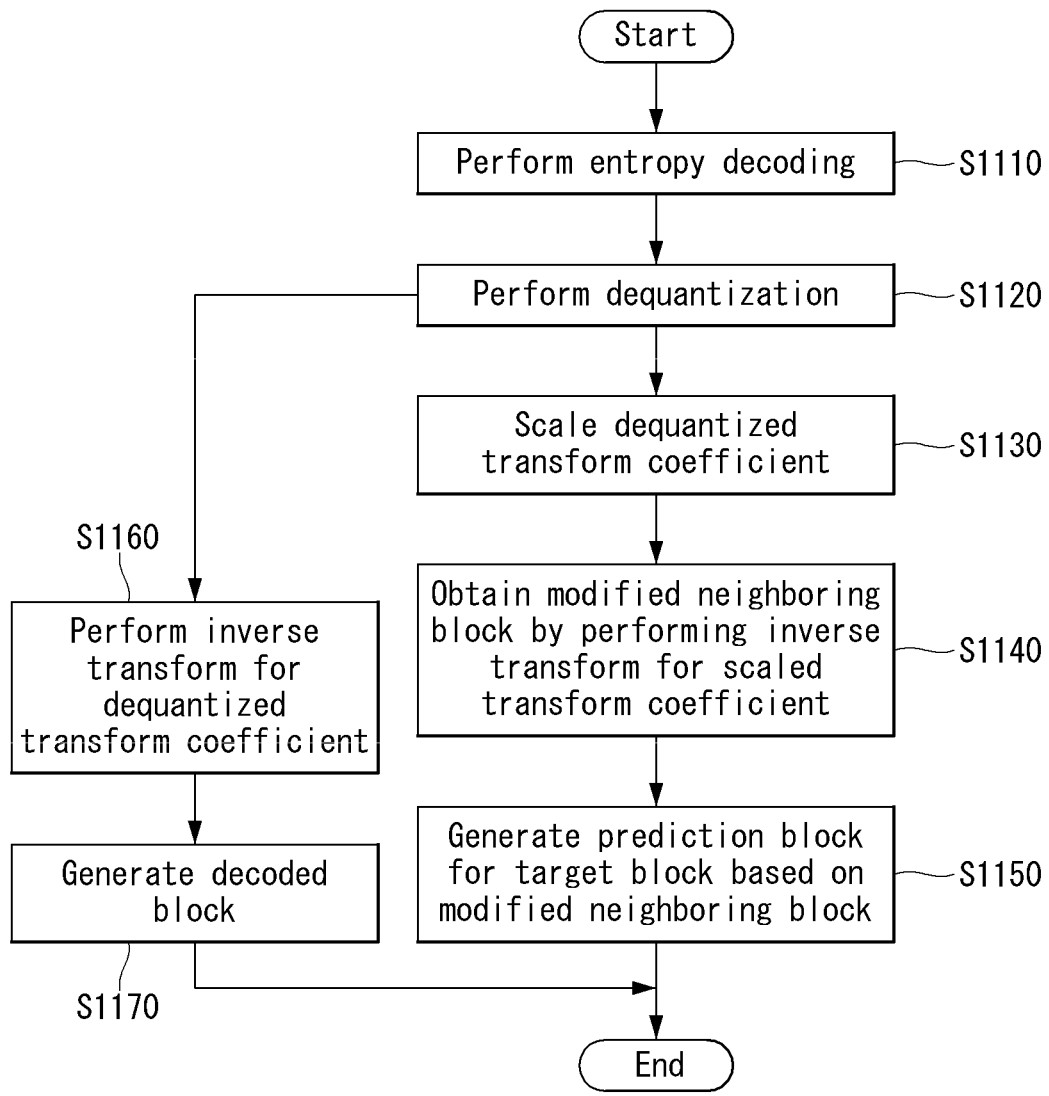

[FIG. 12]
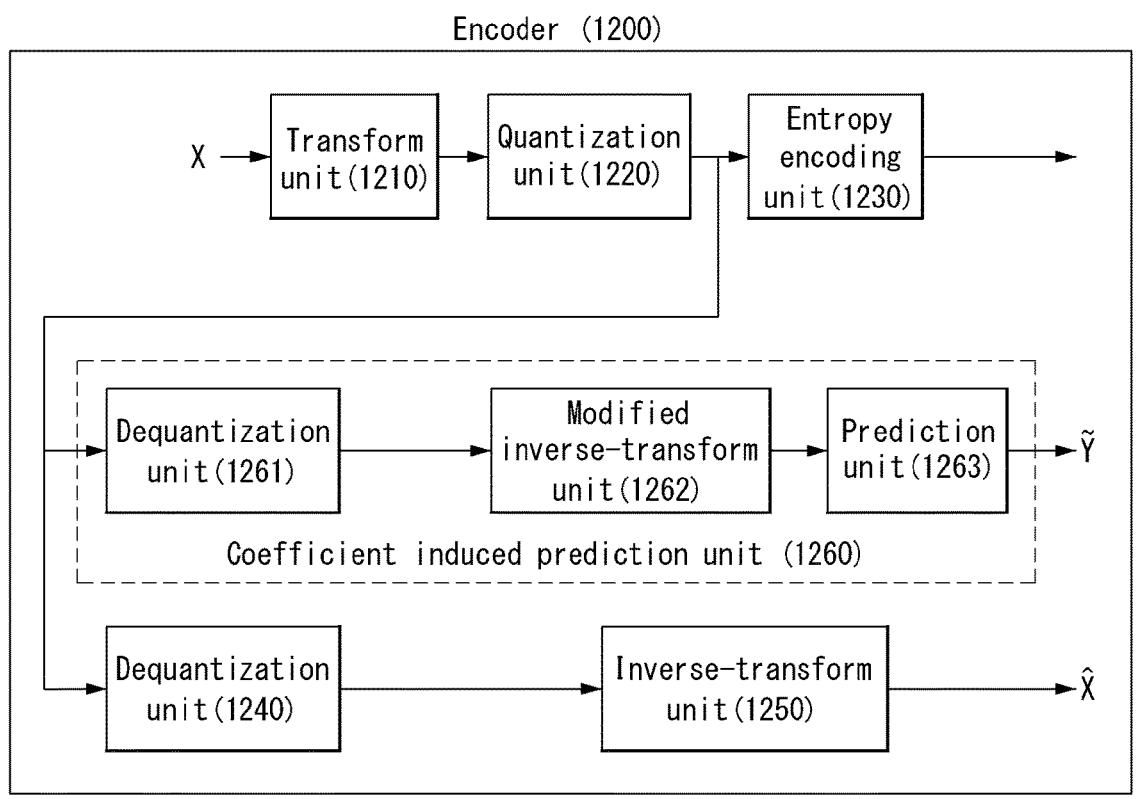

[FIG. 13]
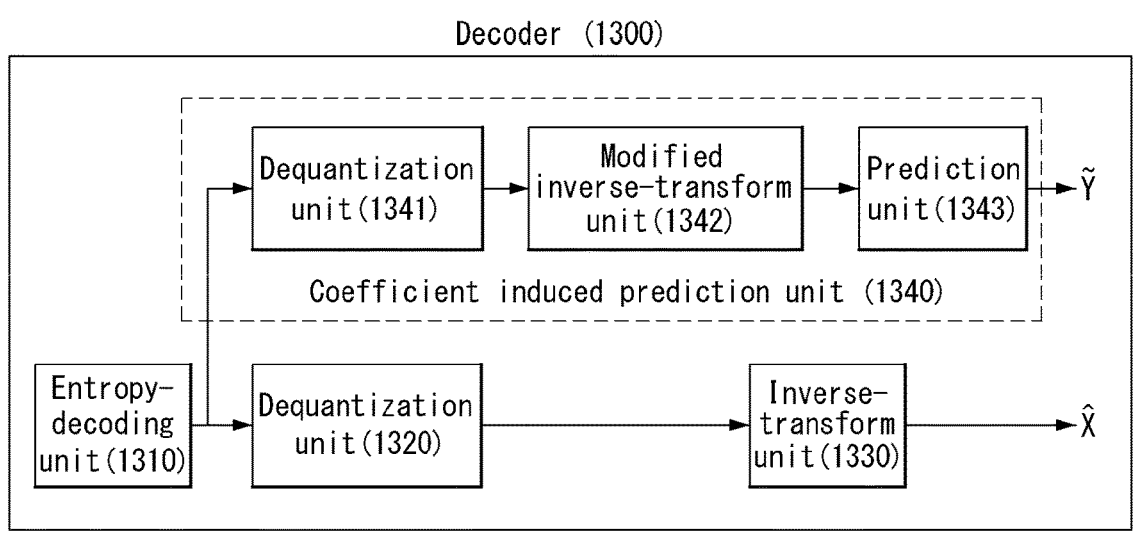

[FIG. 14]
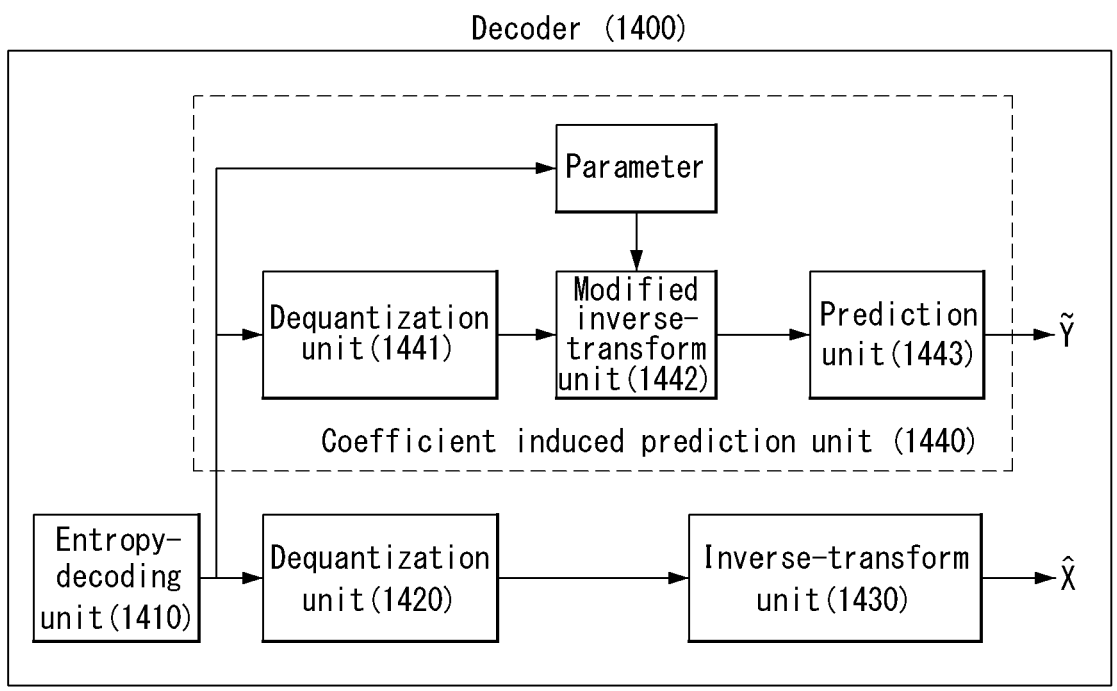

[FIG. 15]
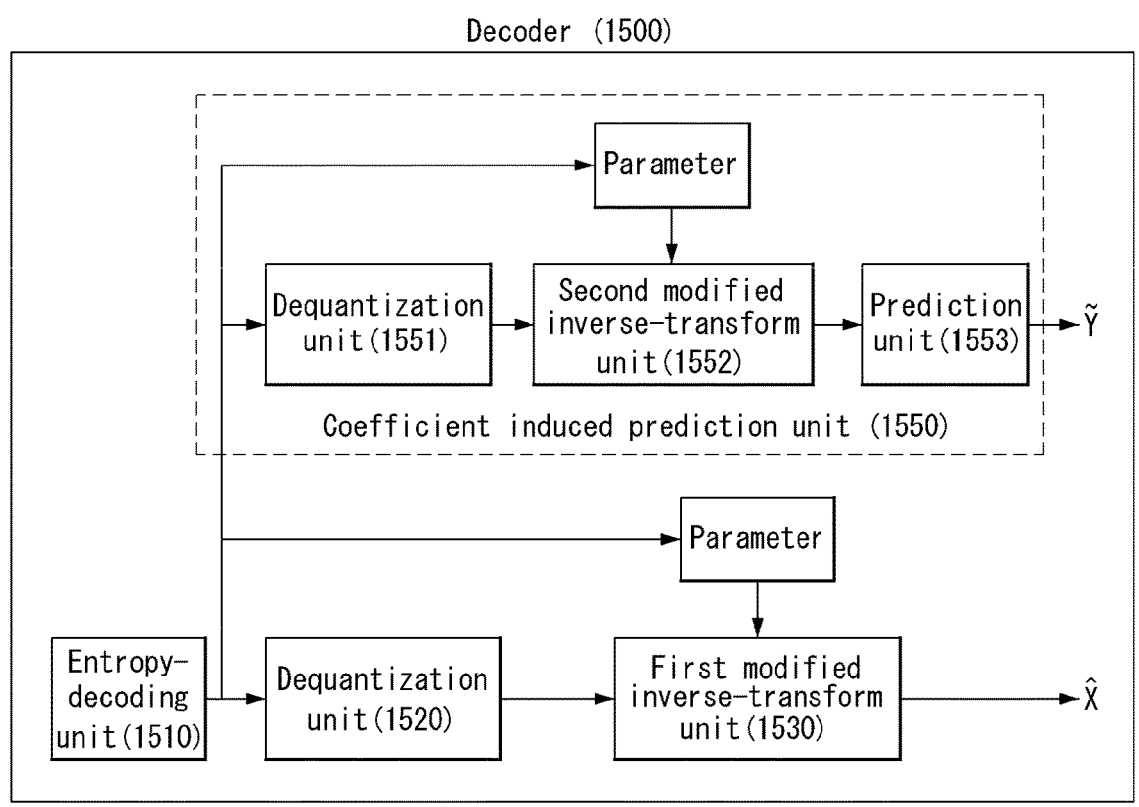

[FIG. 16]
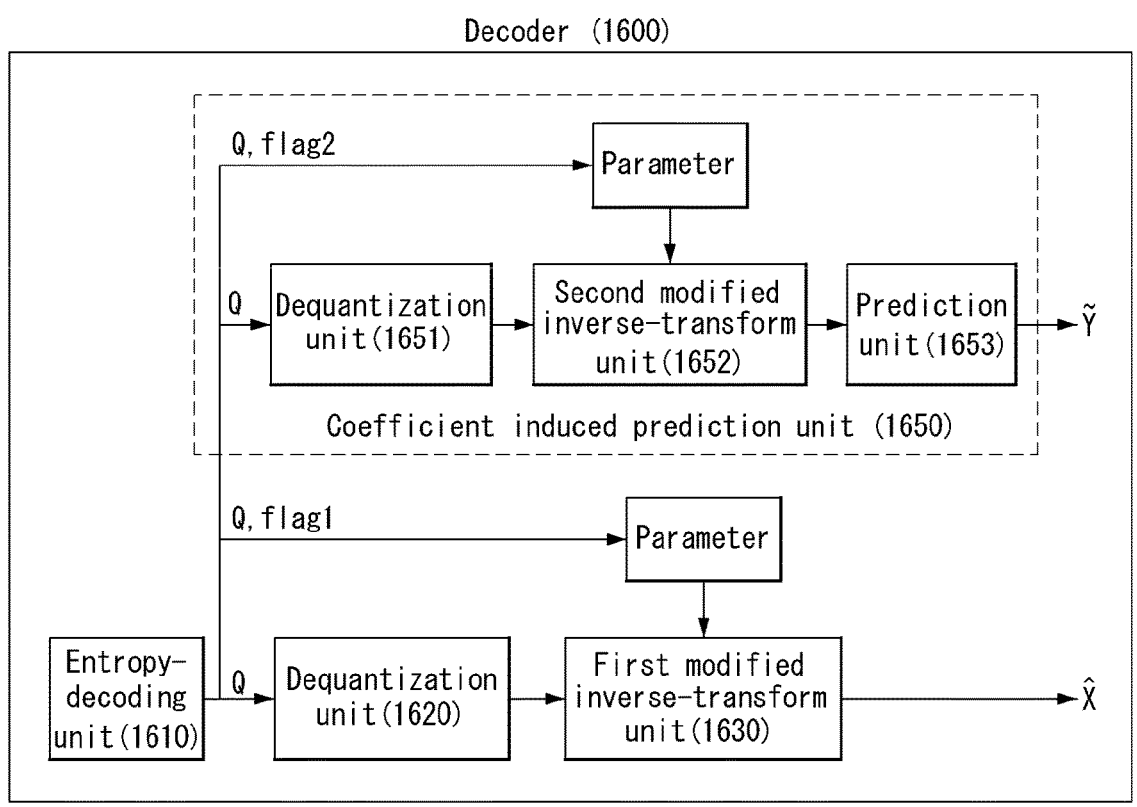

[FIG. 17]
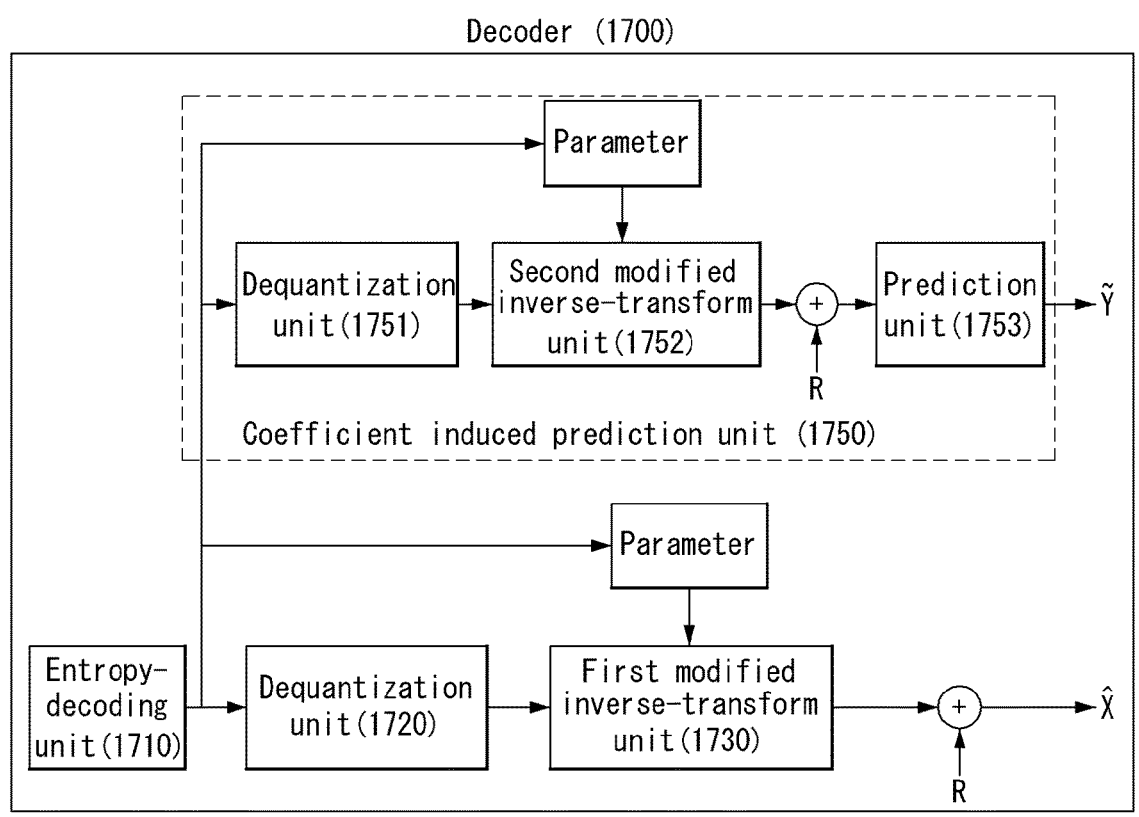

[FIG. 18]
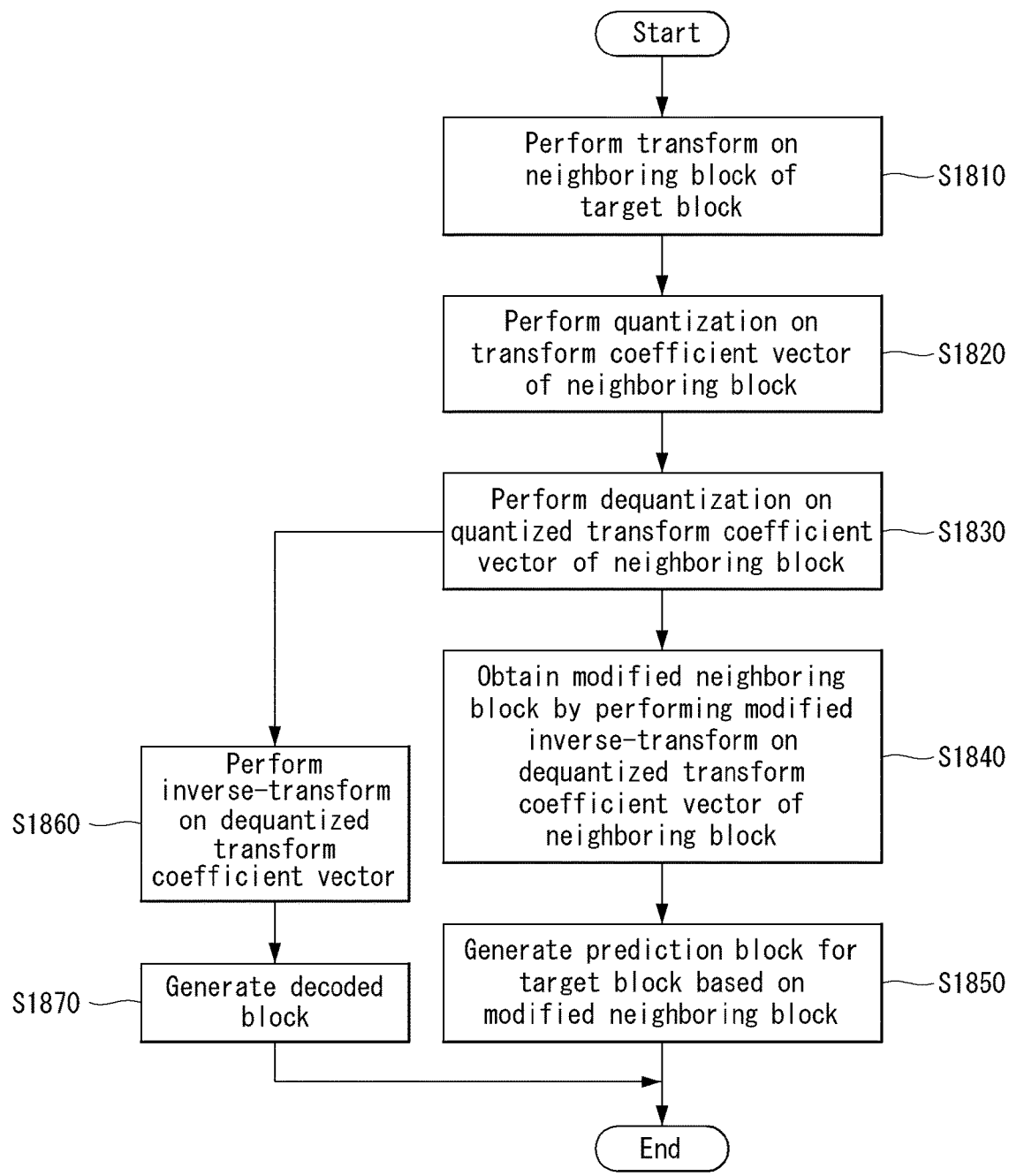

[FIG. 19]
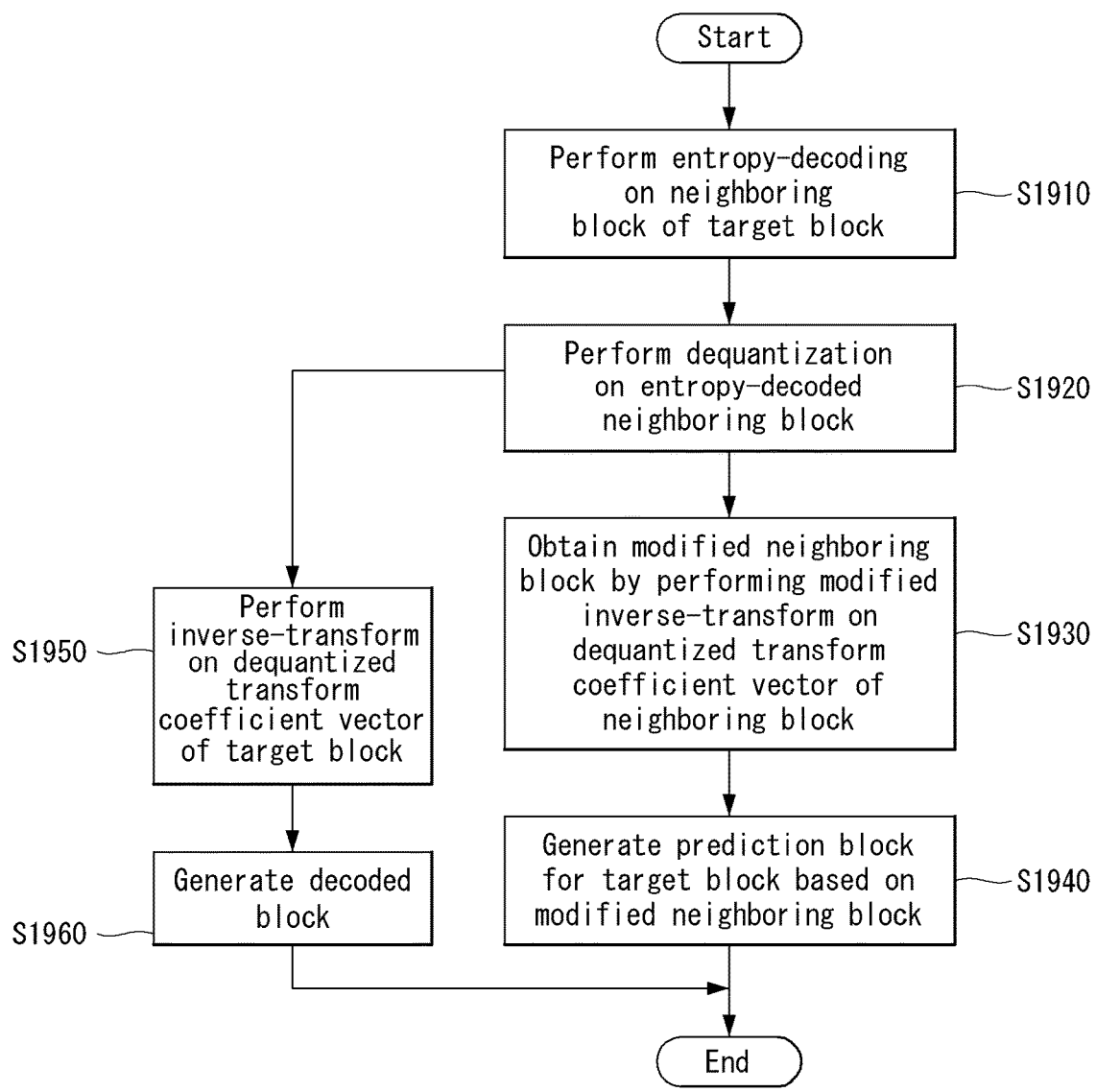

METHOD AND APPARATUS FOR PROCESSING VIDEO SIGNAL USING COEFFICIENT-INDUCED RECONSTRUCTION

CROSS-REFERENCE TO RELATED APPLICATIONS

This application is a National Stage application under 35 U.S.C. § 371 of International Application No. PCT/KR2017/004950, filed on May 12, 2017, which claims the benefit of U.S. Provisional Application No. 62/335,629, filed on May 12, 2016. The disclosures of the prior applications are incorporated by reference in their entirety.

TECHNICAL FIELD

The present invention relates to a method and apparatus for encoding, decoding a video signal using a coefficient induced reconstruction (CIR). Specifically, the present invention relates to a method and apparatus for performing prediction using a reference pixel generated through a modified inverse-transform in which a different scaling matrix is applied to each pixel location reconstructed with respect to the dequantized transform coefficient vector of a neighboring block.

BACKGROUND ART

Compression encoding means a series of signal processing techniques for transmitting digitized information through a communication line or techniques for storing the information in a form that is proper for a storage medium. The media including a picture, an image, an audio, and the like may be a target for compression encoding, and particularly, a technique for performing compression encoding targeted to a picture is referred to as video image compression.

Next-generation video content is supposed to have the characteristics of high spatial resolution, a high frame rate and high dimensionality of scene representation. In order to process such content, a drastic increase of memory storage, memory access rate and processing power will result.

Accordingly, it is necessary to design a coding tool for processing next-generation video content more efficiently. In particular, a prediction method is used to utilize a correlation between the original data and prediction data, but has a problem in that quantization noise is generated. Simple prediction methods used due to computational complexity have a problem in that the correlation is weakened.

DISCLOSURE

Technical Problem

The present invention is to provide a method of performing better prediction.

The present invention is to provide a method of applying a different reconstruction base to each transform coefficient.

The present invention is to provide a method for enhancing a reference pixel used in a prediction process.

The present invention is to provide a method of processing a video signal using a correlation between reference data and prediction data.

The present invention is to provide a method of reducing the influence of quantization noise in prediction.

Technical Solution

The present invention provides a method of applying a different reconstruction base to each transform coefficient.

The present invention provides a method of applying a different scaling matrix to each pixel location reconstructed with respect to the dequantized transform coefficient vector of a neighboring block.

The present invention provides a method of determining a coefficient induced reconstruction function so as to perform a modified inverse-transform.

The present invention provides a method of defining a modified scaling application flag indicating whether a modified inverse-transform is applied.

The present invention provides a method of signaling or deriving a modified scaling application flag.

The present invention provides a method of performing better prediction by performing scaling on the transform coefficient of a neighboring block.

The present invention provides a method of scaling a dequantized transform coefficient.

The present invention provides a method of determining a scaling matrix based on a compression parameter.

The present invention provides a method of signaling or deriving a scaling application flag indicating whether or not to perform a scaling on a dequantized transform coefficient.

The present invention provides a method of performing better prediction by performing scaling on the transform coefficient of a residual block.

The present invention provides a method of generating a reconstructed pixel using a modified residual block and using the reconstructed pixel as a reference block when predicting a next target block.

Advantageous Effects

The present invention can improve coding efficiency by performing prediction using a reference pixel generated through a modified inverse-transform in which a different scaling matrix is applied to each pixel location reconstructed with respect to the dequantized transform coefficient vector of a neighboring block.

Furthermore, the present invention can perform better prediction by modifying a transform coefficient and can enhance compression efficiency by reducing energy of a prediction difference signal.

Furthermore, the present invention can reduce overhead for data processing by providing the method of signaling or deriving a modified scaling application flag indicating whether a modified inverse-transform is applied.

DESCRIPTION OF DRAWINGS

FIG. 1 shows a schematic block diagram of an encoder for encoding a video signal, in accordance with one embodiment of the present invention.

FIG. 2 shows a schematic block diagram of a decoder for decoding a video signal, in accordance with one embodiment of the present invention.

FIG. 3 is an embodiment to which the present invention is applied and shows a schematic block diagram of an encoder and a decoder using a decoded pixel as the prediction value of a next target block.

FIG. 4 is an embodiment to which the present invention is applied and shows a schematic block diagram of an encoder performing encoding using coefficient induced prediction (CIP).

FIG. 5 is an embodiment to which the present invention is applied and shows a schematic block diagram of a decoder performing decoding using coefficient induced prediction (CIP).

FIG. 6 is an embodiment to which the present invention is applied and shows a schematic block diagram of a decoder for illustrating a method of determining a scaling matrix if decoding is performed using coefficient induced prediction (CIP).

FIG. 7 is an embodiment to which the present invention is applied and shows a schematic block diagram of a decoder performing decoding using the scaling of a transform coefficient for a target block along with coefficient induced prediction (CIP).

FIG. 8 is an embodiment to which the present invention is applied and shows a schematic block diagram of a decoder performing decoding using at least one scaling application flag indicating whether or not to perform a scaling on the dequantized transform coefficients of a target block and/or a neighboring block.

FIG. 9 is an embodiment to which the present invention is applied and shows a schematic block diagram of a decoder performing coefficient induced prediction (CIP) using a reference block.

FIG. 10 is an embodiment to which the present invention is applied and shows a flowchart of performing encoding using coefficient induced prediction (CIP).

FIG. 11 is an embodiment to which the present invention is applied and shows a flowchart of performing decoding using coefficient induced prediction (CIP).

FIG. 12 is an embodiment to which the present invention is applied and is a schematic block diagram of an encoder performing encoding using a coefficient induced reconstruction (CIR).

FIG. 13 is an embodiment to which the present invention is applied and is a schematic block diagram of a decoder performing decoding using a coefficient induced reconstruction (CIR).

FIG. 14 is an embodiment to which the present invention is applied and is a schematic block diagram of a decoder for illustrating a method of determining a modified inverse-transform matrix when decoding is performed using a coefficient induced reconstruction (CIR).

FIG. 15 is an embodiment to which the present invention is applied and is a schematic block diagram of a decoder performing decoding a coefficient induced reconstruction (CIR) for a neighboring block and a modified inverse-transform for a target block.

FIG. 16 is an embodiment to which the present invention is applied and is a schematic block diagram of a decoder performing decoding using at least one modified scaling application flag indicating whether a modified inverse-transform is applied to the dequantized transform coefficient of a target block and/or a neighboring block.

FIG. 17 is an embodiment to which the present invention is applied and is a schematic block diagram of a decoder performing a coefficient induced reconstruction (CIR) using a reference block.

FIG. 18 is an embodiment to which the present invention is applied and shows a flowchart performing encoding using a coefficient induced reconstruction (CIR) for a neighboring block.

FIG. 19 is an embodiment to which the present invention is applied and shows a flowchart performing decoding using a coefficient induced reconstruction (CIR) for a neighboring block.

BEST MODE

The present invention provides a method of performing an enhanced prediction on a video signal, including performing an entropy-decoding on a neighbor block neighboring a target block; performing a dequantization on the entropy-decoded neighbor block; obtaining a modified neighboring block by performing a modified inverse-transform on a dequantized transform coefficient vector of the neighbor block; and generating a prediction block for the target block based on the modified neighboring block, wherein when the modified inverse-transform is performed, a different scaling matrix is applied to each pixel location reconstructed with respect to the dequantized transform coefficient vector of the neighbor block.

Furthermore, in the present invention, the modified inverse-transform is performed using a modified inverse-transform matrix, the modified inverse-transform matrix is determined based on a coefficient induced reconstruction function, and the coefficient induced reconstruction function includes a row component of the modified inverse-transform matrix and a scaling matrix component corresponding to the row component.

Furthermore, in the present invention, the modified inverse-transform matrix is derived based on a coding parameter, and the coding parameter includes at least one of an intra-prediction mode, an inter-prediction mode, a quantization parameter, or a block size.

Furthermore, in the present invention, the modified inverse-transform matrix is determined based on a quantized transform coefficient vector.

Furthermore, in the present invention, the scaling matrix component corresponding to the row component is determined based on at least one of a column component of the modified inverse-transform matrix, a quantized transform coefficient vector corresponding to the column component, or a coding parameter.

Furthermore, in the present invention, the coefficient induced reconstruction function is determined to minimize a difference between the neighbor block and the modified neighboring block.

Furthermore, in the present invention, The method further includes extracting a modified scaling application flag from the video signal, and the modified scaling application flag indicates whether the modified inverse-transform is applied.

Furthermore, in the present invention, the method further includes deriving a modified scaling application flag from the video signal. The modified scaling application flag is derived based on at least one of coding information of the neighbor block or a modified scaling application flag of the neighbor block.

Furthermore, the present invention provides a method of performing an enhanced prediction on a video signal, including performing a transform on a neighbor block of a target block; quantizing a transform coefficient for the neighbor block; dequantizing the quantized transform coefficient of the neighbor block; obtaining a modified neighboring block by performing a modified inverse-transform on a dequantized transform coefficient vector of the neighbor block; and generating a prediction block for the target block based on the modified neighboring block, when the modified inverse-transform is performed, a different scaling matrix is applied to each pixel location reconstructed with respect to the dequantized transform coefficient vector of the neighbor block.

Furthermore, the present invention provides an apparatus for performing an enhanced prediction on a video signal, including an entropy decoding unit performing an entropy-decoding on a neighbor block neighboring a target block; a dequantization unit performing a dequantization on the entropy-decoded neighbor block; a modified inverse-transform unit obtaining a modified neighboring block by performing a modified inverse-transform on a dequantized transform coefficient vector of the neighbor block; and a prediction unit generating a prediction block for the target block based on the modified neighboring block, when the modified inverse-transform is performed, a different scaling matrix is applied to each pixel location reconstructed with respect to the dequantized transform coefficient vector of the neighbor block.

Furthermore, the present invention provides an apparatus for performing an enhanced prediction on a video signal, including a transform unit performing a transform on a neighbor block of a target block; a quantization unit quantizing a transform coefficient for the neighbor block; a dequantization unit dequantizing a quantized transform coefficient of the neighbor block; a modified inverse-transform unit obtaining a modified neighboring block by performing a modified inverse-transform on a dequantized transform coefficient vector of the neighbor block; and a prediction unit generating a prediction block for the target block based on the modified neighboring block, when the modified inverse-transform is performed, a different scaling matrix is applied to each pixel location reconstructed with respect to the dequantized transform coefficient vector of the neighbor block.

Mode for Invention

Hereinafter, exemplary elements and operations in accordance with embodiments of the present invention are described with reference to the accompanying drawings, however, it is to be noted that the elements and operations of the present invention described with reference to the drawings are provided as only embodiments and the technical spirit and kernel configuration and operation of the present invention are not limited thereto.

Furthermore, terms used in this specification are common terms that are Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Furthermore, partitioning, decomposition, splitting, division may also be properly replaced and interpreted in each coding process. Furthermore, filtering, a modification, a change and scaling may also be properly substituted and construed in each coding process.

The present invention provides a technology for performing prediction by applying different reconstruction bases to transform coefficients. In this specification, such a prediction technology is called a "coefficient induced reconstruction (CIR)." For example, the present invention provides a method of applying a different scaling matrix to each pixel location reconstructed with respect to the dequantized transform coefficient vector of a neighboring block.

Furthermore, the present invention provides a technology for performing prediction by performing scaling on all transform coefficients. In this specification, this is called a "coefficient induced prediction (CIP)" in order to distinguish it from the coefficient induced reconstruction (CIR). For example, the present invention provides a method of filtering the dequantized transform coefficient of a neighboring block similar to the original pixel when performing a prediction coding and then performing prediction using a reference pixel generated through an inverse-transform.

However, the coefficient induced reconstruction (CIR) may be called a "coefficient induced prediction (CIP)" in a broad sense because it is a technology for performing prediction. Conceptually, the coefficient induced reconstruction may embrace the coefficient induced prediction. Accordingly, in this specification, it is evident that the coefficient induced prediction may be differently interpreted depending on context although it is expressed.

FIG. 1 shows a schematic block diagram of an encoder for encoding a video signal in accordance with one embodiment of the present invention.

Referring to FIG. 1, the encoder 100 may include an image segmentation unit 110, a transform unit 120, a quantization unit 130, a dequantization unit 140, an inverse-transform unit 150, a filtering unit 160, a DPB (Decoded Picture Buffer) 170, an inter prediction unit 180, an intra prediction unit 185 and an entropy-encoding unit 190.

The image segmentation unit 110 may divide an input image (or, a picture, a frame) input to the encoder 100 into one or more process units. For example, the process unit may be a coding tree unit (CTU), a coding unit (CU), a prediction unit (PU), or a transform unit (TU).

However, the terms are used only for convenience of illustration of the present disclosure. The present invention is not limited to the definitions of the terms. In this specification, for convenience of illustration, the term "coding unit" is employed as a unit used in a process of encoding or decoding a video signal. However, the present invention is not limited thereto. Another process unit may be appropriately selected based on contents of the present disclosure.

The encoder 100 may generate a residual signal by subtracting a prediction signal output by the inter prediction unit 180 or intra prediction unit 185 from the input image signal. The generated residual signal may be transmitted to the transform unit 120.

The transform unit 120 may apply a transform technique to the residual signal to produce a transform coefficient. The transform process may be applied to a pixel block having the same size of a square, or to a block of a variable size other than a square.

The quantization unit 130 may quantize the transform coefficient and transmits the quantized coefficient to the entropy-encoding unit 190. The entropy-encoding unit 190 may entropy-code the quantized signal and then output the entropy-coded signal as a bit stream.

The quantized signal output by the quantization unit 130 may be used to generate a prediction signal. For example, the quantized signal may be subjected to an inverse quantization and an inverse-transform via the dequantization unit 140 and the inverse-transform unit 150 in the loop respectively to reconstruct a residual signal. The reconstructed residual signal may be added to the prediction signal output by the inter prediction unit 180 or intra prediction unit 185 to generate a reconstructed signal.

Meanwhile, in the compression process, a neighboring block may be quantized by different quantization parameters, so that deterioration of the block boundary may occur. This phenomenon is called blocking artifacts. This is one of important factors for evaluating image quality. A filtering process may be performed to reduce such deterioration. Using the filtering process, the blocking deterioration may be eliminated, and, at the same time, an error of a current picture may be reduced, thereby improving the image quality.

The filtering unit 160 may apply filtering to the reconstructed signal and then outputs the filtered reconstructed signal to a reproducing device or the decoded picture buffer 170. The filtered signal transmitted to the decoded picture buffer 170 may be used as a reference picture in the inter prediction unit 180. In this way, using the filtered picture as the reference picture in the inter-picture prediction mode, not only the picture quality but also the coding efficiency may be improved.

The decoded picture buffer 170 may store the filtered picture for use as the reference picture in the inter prediction unit 180.

The inter prediction unit 180 may perform temporal prediction and/or spatial prediction with reference to the reconstructed picture to remove temporal redundancy and/or spatial redundancy. In this case, the reference picture used for the prediction may be a transformed signal obtained via the quantization and inverse quantization by a block unit in the previous encoding/decoding. Thus, this may result in blocking artifacts or ringing artifacts.

Accordingly, in order to solve the performance degradation due to the discontinuity or quantization of the signal, the inter prediction unit 180 may interpolate signals between pixels by a subpixel unit using a low-pass filter. In this case, the subpixel may mean a virtual pixel generated by applying an interpolation filter. An integer pixel means an actual pixel existing in the reconstructed picture. The interpolation method may include linear interpolation, bi-linear interpolation and Wiener filter, etc.

The interpolation filter may be applied to the reconstructed picture to improve the accuracy of the prediction. For example, the inter prediction unit 180 may apply the interpolation filter to integer pixels to generate interpolated pixels. The inter prediction unit 180 may perform prediction using an interpolated block composed of the interpolated pixels as a prediction block.

The intra prediction unit 185 may predict a current block by referring to samples in the vicinity of a block to be encoded currently. The intra prediction unit 185 may perform a following procedure to perform intra prediction. First, the intra prediction unit 185 may prepare reference samples needed to generate a prediction signal. Then, the intra prediction unit 185 may generate the prediction signal using the prepared reference samples. Thereafter, the intra prediction unit 185 may encode a prediction mode. At this time, reference samples may be prepared through reference sample padding and/or reference sample filtering. Since the reference samples have undergone the prediction and reconstruction process, a quantization error may exist. Therefore, in order to reduce such errors, a reference sample filtering process may be performed for each prediction mode used for intra-prediction.

The prediction signal generated by the inter prediction unit 180 or the intra prediction unit 185 may be used to generate the reconstructed signal or used to generate the residual signal. In this case, the prediction signal may be applied to various embodiments described in this specification.

In one embodiment, the present invention may obtain a modified neighboring block by performing a modified inverse-transform on a dequantized transform coefficient for a neighboring block, and may use the modified neighboring block as a prediction block. In this case, in the modified inverse-transform, a different scaling matrix is applied to each pixel location reconstructed with respect to the dequantized transform coefficient vector of the neighboring block.

In one embodiment, the modified inverse-transform is performed using a modified inverse-transform matrix. The modified inverse-transform matrix is determined based on a coefficient induced reconstruction function. The coefficient induced reconstruction function includes a scaling matrix component corresponding to the row component and row component of the modified inverse-transform matrix.

In one embodiment, the modified inverse-transform matrix is derived based on a coding parameter. The coding parameter includes at least one of an intra-prediction mode, an inter-prediction mode, a quantization parameter or a block size.

In one embodiment, the modified inverse-transform matrix may be determined based on a quantized transform coefficient vector.

In one embodiment, the scaling matrix component corresponding to the row component may be determined based on at least one of the column component of the modified inverse-transform matrix, a quantized transform coefficient vector corresponding to the column component or a coding parameter.

In one embodiment, the coefficient induced reconstruction function may be determined to minimize a difference between the neighboring block and the modified neighboring block.

FIG. 2 shows a schematic block diagram of a decoder for decoding a video signal, in accordance with one embodiment of the present invention.

Referring to FIG. 2, the decoder 200 may be configured to include a parsing unit (not shown), an entropy-decoding unit 210, a dequantization unit 220, an inverse-transform unit 230, a filtering unit 240, a decoded picture buffer unit (DPB) 250, an inter-prediction unit 260, an intra-prediction unit 265, and a reconstruction unit (not shown).

A reconstructed video signal output by the decoder 200 may be reproduced using a reproducing device.

The decoder 200 may receive a bit stream and parse coding information necessary for signal reconstruction from the bit stream through the parsing unit (not shown).

The received bit stream may be entropy-decoded through the entropy-decoding unit 210.

In an embodiment of the present invention, the parsing unit may extract a modified scaling application flag from the bit stream. In this case, the modified scaling application flag indicates whether the modified inverse-transform is applied.

However, the present invention is not limited thereto, and the modified scaling application flag may be derived in the decoder. For example, the modified scaling application flag may be derived based on at least one of coding information of a neighboring block or the modified scaling application flag of the neighboring block.

The dequantization unit 220 may obtain a transform coefficient from the entropy-decoded signal using quantization step size information.

The inverse-transform unit 230 may inverse-transform the transform coefficient to obtain a residual signal.

A reconstructed signal may be generated by adding the obtained residual signal to the prediction signal output by the inter prediction unit 260 or the intra prediction unit 265. In this case, various embodiments described in this specification in addition to the embodiments of FIG. 1 may be applied to the prediction signal.

The filtering unit 240 may apply filtering to the reconstructed signal and may output the filtered reconstructed signal to the reproducing device or the decoded picture buffer unit 250. The filtered signal transmitted to the decoded picture buffer unit 250 may be used as a reference picture in the inter prediction unit 260.

Herein, detailed descriptions for the filtering unit 160, the inter prediction unit 180 and the intra prediction unit 185 of the encoder 100 may be equally applied to the filtering unit 240, the inter prediction unit 260 and the intra prediction unit 265 of the decoder 200 respectively.

FIG. 3 is an embodiment to which the present invention is applied and shows a schematic block diagram of an encoder and a decoder using a decoded pixel as the prediction value of a next target block.

An embodiment of the present invention provides a method of filtering the dequantized transform coefficient of a neighboring block similar to the original pixel when performing a prediction coding and then performing prediction using a reference pixel generated through an inverse-transform.

Furthermore, in the present invention, transform coefficients can be modified along with quantization parameters by modifying the transform coefficients quantized for prediction and reconstruction, thereby being capable of reducing the influence of quantization noise for prediction. Furthermore, a transform coefficient modification can be coupled with a simple prediction method in such a way as to minimize overall computational complexity. In this case, the transform coefficient modification is non-linear and can provide a predictor that may not be obtained by the existing linear prediction method.

The present invention may be applied to intra prediction and/or inter prediction in a video compression process, but the present invention is not limited thereto and may be applied to various signal processing and compression applications.

Referring to FIG. 3, the encoder 310 to which the present invention is applied may include a transform unit 311, a quantization unit 312, an entropy encoding unit 313, a dequantization unit 314, an inverse-transform unit 315, and a prediction unit 316. The decoder 320 may include an entropy decoding unit 321, a dequantization unit 322, an inverse-transform unit 323, and a prediction unit 324.

The operations and characteristics of the aforementioned function units may be applied to the function units described in the drawings of this specification. Hereinafter, a redundant description is omitted, and only a different portion or portions necessary to supplement each embodiment are described.

First, when the original video signal X is received, the encoder 310 may perform transform through the transform unit 311 and perform quantization through the quantization unit 312. The quantized signal may be transmitted to the decoder 320 via the entropy encoding unit 313. In this case, the original video signal X may include an 8×8 block of a video frame, for example. Furthermore, the present invention is not limited thereto, and the original video signal X may correspond to a residual signal or prediction error signal obtained by subtracting a prediction signal from the original signal. In this case, other terms may be construed based on the residual signal so that the concept of the present invention can be applied to the residual signal.

Meanwhile, the quantized signal may be dequantized/inverse-transformed through the dequantization unit 314 and the inverse-transform unit 315. A signal decoded as described above may be expressed as $\hat{X}$. In this case, if a neighboring block within the same video frame is Y, a prediction signal $\tilde{Y}$ for the neighboring block may be generated from the decoded signal $\hat{X}$ through the prediction unit 316. This is represented as Equations 1 to 3 in the form of an equation.

$$\hat{C} = \text{dequantize}(Q) \qquad \text{[Equation 1]}$$

In this case, Q indicates the vector of quantized transform coefficients of X, and $\hat{C}$ indicates the vector of dequantized transform coefficients.

$$\hat{X} = T^{-1}\hat{C} \qquad \text{[Equation 2]}$$

In this case, $\hat{X}$ is the results obtained by performing inverse-transform on the vector of the dequantized transform coefficients, and indicates the decoded signal. Furthermore, $T^{-1}$ indicates an inverse-transform matrix and may mean an inverse-DCT matrix, for example.

$$\tilde{Y} = \text{simple\_predict}(T^{-1}\hat{C}) \qquad \text{[Equation 3]}$$

In this case, $\tilde{Y}$ means the prediction signal of a neighboring block Y neighboring a target block. For example, $\tilde{Y}$ may be generated based on $\hat{X}$.

Meanwhile, the decoder 320 may receive the entropy-encoded signal, may perform entropy decoding on the entropy-encoded signal through the entropy decoding unit 321, and may perform dequantization/inverse-transform the entropy-decoded signal through the dequantization unit 322/inverse-transform unit 323. Furthermore, as described in the encoder 310, the decoder 320 may generate the prediction signal $\tilde{Y}$ for the neighboring block from the decoded signal $\hat{X}$ through the prediction unit 324. Hereinafter, a redundant description is omitted.

FIG. 4 is an embodiment to which the present invention is applied and shows a schematic block diagram of an encoder performing encoding using coefficient induced prediction (CIP).

Referring to FIG. 4, the encoder 400 to which the present invention is applied may include a transform unit 410, a quantization unit 420, an entropy encoding unit 430, a dequantization unit 440, an inverse-transform unit 450, and a coefficient induced prediction unit 460. Furthermore, the coefficient induced prediction unit 460 may include a dequantization unit 461, a coefficient modification unit 462, an inverse-transform unit 463, and a prediction unit 464.

The operations and characteristics of the aforementioned function units may be applied to the function units described in the drawings of this specification. Hereinafter, a redundant description is omitted, and only a different portion or portions necessary to supplement each embodiment are described.

First, when the original video signal X is received, the encoder 310 may perform transform through the transform unit 410 and perform quantization through the quantization unit 420. The quantized signal may be transmitted to the decoder through the entropy encoding unit 430. In this case, the original video signal X may include an 8×8 block of a video frame, for example.

The dequantization unit 440 and the inverse-transform unit 450 may generate a decoded signal $\hat{X}$ by dequantizing/inverse-transforming the quantized signal.

Meanwhile, the quantized signal may be transmitted to the coefficient induced prediction unit 460, and coefficient induced prediction may be performed on the quantized signal.

The coefficient induced prediction unit 460 may filter the dequantized transform coefficient of a neighboring block similar to the original pixel, and may then perform prediction using a reference pixel generated through inverse-transform.

For detailed example, the dequantization unit 461 may calculate the dequantized transform coefficient by performing dequantization on the quantized signal.

Furthermore, the coefficient modification unit 462 may modify the dequantized transform coefficient by applying a scaling matrix to the dequantized transform coefficient. For example, the scaling matrix may indicate a diagonal matrix having scaling values.

In an embodiment of the present invention, the scaling matrix may be determined or derived based on a coding parameter. For example, the coding parameter may include at least one of an intra prediction mode, a quantization parameter, or a block size.

The inverse-transform unit 463 may perform inverse-transform on the modified transform coefficient. The prediction unit 464 may generate a prediction signal $\hat{Y}$ based on the result value of the inverse-transform. In this case, the prediction signal $\hat{Y}$ may mean the prediction signal for a neighboring block Y. The prediction signal $\hat{Y}$ for the neighboring block may be called a modified neighboring block.

The inverse-transformed result value may mean a modified signal having a value different from that of the decoded signal $\hat{X}$. The modified signal may be expressed as $\hat{X}'$ and may be called a changed signal or a scaled signal. In this case, the signal may be substituted with a block, frame or pixel and construed.

This is represented as Equation 4 in the form of an equation.

$$\tilde{Y} = \text{simple\_predict}(T^{-1}S\hat{e}) \quad \text{[Equation 4]}$$

In this case, S indicates the diagonal matrix having scaling values, and the diagonal matrix may be called a scaling matrix. $\tilde{Y}$ means the prediction signal of the neighboring block Y neighboring a target block.

The scaling matrix may be determined or derived based on a coding parameter. For example, the coding parameter may include at least one of an intra prediction mode, a quantization parameter, or a block size. Assuming that the coding parameter is obtained as a vector $\Omega$, the scaling matrix may be expressed into the function of $\Omega$, that is, $S(\Omega)$.

In an embodiment of the present invention, the scaling matrix S may be expressed into the function of Q as in Equation 5. The scaling matrix $S(Q,\Omega)$ may be determined based on at least one of Q and $\Omega$.

$$S(Q, \Omega)_{i,j} = \begin{cases} f(i, Q_i, \Omega), & i = j \\ 0, & \text{otherwise} \end{cases} \quad \text{[Equation 5]}$$

In this case, $f(i,Q_i,\Omega)$ indicates the function of indicated parameters, and f may be called a coefficient induced prediction function (CIP function).

FIG. 5 is an embodiment to which the present invention is applied and shows a schematic block diagram of a decoder performing decoding using coefficient induced prediction (CIP).

Referring to FIG. 5, the decoder 500 to which the present invention is applied may include an entropy decoding unit 510, a dequantization unit 520, an inverse-transform unit 530, and a coefficient induced prediction unit 540. Furthermore, the coefficient induced prediction unit 540 may include a dequantization unit 541, a coefficient modification unit 542, an inverse-transform unit 543, and a prediction unit 544.

The operations and characteristics of the aforementioned function units may be applied to the function units described in the drawings of this specification. Hereinafter, a redundant description is omitted, and only a different portion or portions necessary to supplement each embodiment are described.

The decoder 500 may receive an entropy-encoded signal, may perform entropy decoding on the entropy-encoded signal through the entropy decoding unit 510, and may perform dequantization/inverse-transform the entropy-decoded signal through the dequantization unit 520/inverse-transform unit 530.

Meanwhile, the entropy-decoded signal may be transmitted to the coefficient induced prediction unit 540, and coefficient induced prediction may be performed on the entropy-decoded signal.

For example, the coefficient induced prediction unit 540 may generate a modified transform coefficient by scaling the dequantized transform coefficient of a neighboring block using a scaling matrix. Furthermore, the coefficient induced prediction unit 540 may perform inverse-transform on the modified transform coefficient, and may perform prediction using a result value generated from the inverse-transformed coefficient as a reference pixel.

The function units of the coefficient induced prediction unit 540 may operate identically with or similar to the coefficient induced prediction unit 460 of the aforementioned encoder, and a redundant description is hereinafter omitted.

FIG. 6 is an embodiment to which the present invention is applied and shows a schematic block diagram of a decoder for illustrating a method of determining a scaling matrix if decoding is performed using coefficient induced prediction (CIP).

Referring to FIG. 6, the decoder 600 to which the present invention is applied may include an entropy decoding unit 610, a dequantization unit 620, an inverse-transform unit 630, and a coefficient induced prediction unit 640. Furthermore, the coefficient induced prediction unit 640 may include a dequantization unit 641, a coefficient modification unit 642, an inverse-transform unit 643, and a prediction unit 644.

The operations and characteristics of the aforementioned function units may be applied to the function units described in the drawings of this specification. Hereinafter, a redundant description is omitted, and only a different portion or portions necessary to supplement each embodiment are described.

The decoder 600 may receive an entropy-encoded signal, may perform entropy decoding on the entropy-encoded signal through the entropy decoding unit 610, and may perform dequantization/inverse-transform on the entropy-decoded signal through the dequantization unit 620/inverse-transform unit 630.

Furthermore, the entropy-decoded signal may be transmitted to the coefficient induced prediction unit 640, and coefficient induced prediction may be performed on the entropy-decoded signal. The coefficient induced prediction unit 640 may generate a modified transform coefficient by scaling the dequantized transform coefficient of a neighboring block using a scaling matrix. Furthermore, the coefficient induced prediction unit 640 may perform inverse-transform on the modified transform coefficient, and may perform prediction using a result value generated from the inverse-transformed coefficient as a reference pixel.

This is described more specifically. The coefficient modification unit 642 of the coefficient induced prediction unit 640 may generate the modified transform coefficient by applying the scaling matrix to the dequantized transform coefficient of a neighboring block. In this case, in order to determine the scaling matrix, at least one parameter may be used. For example, the at least one parameter may include a training set of $(X,Y,\Omega)$ triplets. Alternatively, the at least one parameter may include a coding parameter. The coding parameter may include at least one of an intra prediction mode, an inter prediction mode, a quantization parameter, or a block size.

For another example, the coefficient modification unit 642 may use at least one parameter to generate the modified transform coefficient, and an example thereof has been described above.

An embodiment of the present invention proposes a method of determining a scaling matrix.

First, $\psi$ is assumed to be a training set of $(X,Y,\Omega)$ triplets. The scaling matrix may be obtained by searching for an optimal coefficient induced prediction function (CIP function). The optimal coefficient induced prediction function may be obtained through Equation 6. For example, the optimal coefficient induced prediction function may correspond to a value that minimizes the difference between a neighboring block Y and the prediction signal Y of the neighboring block.

$$f^* = \underset{f}{\mathrm{argmin}} \sum_{(X,Y,\Omega) \in \psi} \| Y - \mathrm{simple\_predict}(T^{-1}S(Q,\Omega)\hat{C}) \|_2^2 \quad \text{[Equation 6]}$$

In this case, $S(Q,\Omega)$ may be defined as the function according to Equation 5 as described above.

FIG. 7 is an embodiment to which the present invention is applied and shows a schematic block diagram of a decoder performing decoding using the scaling of a transform coefficient for a target block along with coefficient induced prediction (CIP).

The present invention can perform better prediction by applying a scaling matrix to the dequantized transform coefficient of a target block in addition to by performing coefficient induced prediction (CIP) on the dequantized transform coefficient of a neighboring block.

Referring to FIG. 7, the decoder 700 to which the present invention is applied may include an entropy decoding unit 710, a dequantization unit 720, a first coefficient modification unit 730, an inverse-transform unit 740, and a coefficient induced prediction unit 750. Furthermore, the coefficient induced prediction unit 750 may include a dequantization unit 751, a second coefficient modification unit 752, an inverse-transform unit 753, and a prediction unit 754.

The operations and characteristics of the aforementioned function units may be applied to the function units described in the drawings of this specification. Hereinafter, a redundant description is omitted, and only a different portion or portions necessary to supplement each embodiment are described.

First, the decoder 700 may receive an entropy-encoded signal, may perform entropy decoding on the entropy-encoded signal through the entropy decoding unit 710, and may generate the dequantized transform coefficient of a target block by performing dequantization on the entropy-decoded signal through the dequantization unit 720.

The first coefficient modification unit 730 may generate the modified transform coefficient of the target block by applying a first scaling matrix to the dequantized transform coefficient of the target block. In this case, in order to determine the first scaling matrix, at least one parameter may be used. For example, the at least one parameter may include a training set of $(X,Y,\Omega)$ triplets.

Such a process is represented as Equations 7 and 8 in the form of an equation.

$$\hat{C} = \mathrm{dequanitize}(Q) \quad \text{[Equation 7]}$$

$$\hat{X} = T^{-1}S_1(Q,\Omega)\hat{C} \quad \text{[Equation 8]}$$

In this case, S1 indicates the first scaling matrix, and $\hat{X}$ indicates a modified decoded signal.

Furthermore, the modified transform coefficient of the target block may be decoded by performing inverse-transform through the inverse-transform unit 740.

Meanwhile, the contents described in FIG. 6 may be applied to the dequantization unit 751, second coefficient modification unit 752, inverse-transform unit 753 and prediction unit 754 of the coefficient induced prediction unit 750. The scaling matrix used in the second coefficient modification unit 752 may be called a second scaling matrix.

A process obtained through the coefficient induced prediction unit 750 may be represented as Equation 9.

$$\tilde{Y} = \mathrm{simple\_predict}(T^{-1}S_2(Q,\Omega)\tilde{C}) \quad \text{[Equation 9]}$$

In this case, S2 may indicate the second scaling matrix.

In an embodiment of the present invention, the first scaling matrix and the second scaling matrix may have different values. However, the present invention is not limited thereto, and the same matrix may be applied to the two scaling matrices.

The first scaling matrix S1 and the second scaling matrix S2 are represented as Equations 10 and 11 in the form of an equation.

$$S_1(Q,\Omega)_{i,j} = \begin{cases} f_1(i, Q_i, \Omega), & i = j \\ 0, & \text{otherwise} \end{cases} \quad \text{[Equation 10]}$$

$$S_2(Q,\Omega)_{i,j} = \begin{cases} f_2(i, Q_i, \Omega), & i = j \\ 0, & \text{otherwise} \end{cases} \quad \text{[Equation 11]}$$

In this case, $f(i,Q_i,\Omega)$ indicates the function of indicated parameters, and f may be called a coefficient induced prediction function (CIP function).

In an embodiment of the present invention, each of the scaling matrices S1 and S2 may be obtained by searching for an optimal coefficient induced prediction function (CIP function). The optimal coefficient induced prediction functions $f_1^*$ and $f_2^*$ may be obtained through Equations 12 and 13. For example, in Equation 12, the first optimal coefficient induced prediction function $f_1^*$ may correspond to a value that minimizes the difference between the target block X and the modified decoded signal $\hat{X}$. Furthermore, in Equation 13, the second optimal coefficient induced prediction function $f_2^*$ may correspond to a value that minimizes the difference between a neighboring block Y and the prediction signal $\tilde{Y}$ of the neighboring block.

$$f_1^* = \underset{f_1}{\operatorname{argmin}} \sum\nolimits_{(X,Y,\Omega) \in \psi} \left\| X - T^{-1} S_1(Q, \Omega) \hat{C} \right\|_2^2 \quad \text{[Equation 12]}$$

$$f_2^* = \underset{f_2}{\operatorname{argmin}} \sum\nolimits_{(X,Y,\Omega) \in \psi} \left\| Y - \text{simple\_predict}(T^{-1} S_2(Q, \Omega) \hat{C}) \right\|_2^2 \quad \text{[Equation 13]}$$

In this case, ψ indicates a training set of (X,Y,Ω) triplets.

FIG. 8 is an embodiment to which the present invention is applied and shows a schematic block diagram of a decoder performing decoding using at least one scaling application flag indicating whether or not to perform a scaling on the dequantized transform coefficients of a target block and/or a neighboring block.

Referring to FIG. 8, the decoder 800 to which the present invention is applied may include an entropy decoding unit 810, a dequantization unit 820, a first coefficient modification unit 830, an inverse-transform unit 840, and a coefficient induced prediction unit 850. Furthermore, the coefficient induced prediction unit 850 may include a dequantization unit 851, a second coefficient modification unit 852, an inverse-transform unit 853, and a prediction unit 854. The contents of FIG. 7 may be applied to the function units of the decoder. Furthermore, the operations and characteristics of the aforementioned function units may be applied to the function units of the decoder. Hereinafter, a redundant description is omitted, and only a different portion or portions necessary to supplement each embodiment are described.

The present invention defines a scaling application flag indicating whether or not to perform a scaling on a dequantized transform coefficient. For example, a flag indicating whether or not to perform a scaling on the dequantized transform coefficient of a target block may be called a first scaling application flag or a target scaling application flag. A flag indicating whether or not to perform a scaling on the dequantized transform coefficient of a neighboring block may be called a second scaling application flag or a neighboring scaling application flag.

In this case, in using the expression "scaling application flag", scaling may be substituted with a term, such as filtering, a modification or a change, and used as described above.

The scaling application flag may be defined in various levels (e.g., a sequence, a frame, a slice, a coding unit, a prediction unit, and a transform unit), but the present invention is not limited thereto. The scaling application flag may be used in at least one level.

Furthermore, the scaling application flag may be signaled and transmitted to the decoder, but the present invention is not limited thereto. The scaling application flag may be derived based on coding information. For example, the coding information may include at least one of the coding parameter of a current block or neighboring block, information common to the encoder/decoder, and information corresponding to Ω/Q.

In the present invention, the aforementioned embodiments of FIGS. 3 to 7 may be performed based on the scaling application flag.

For example, the present invention may perform coefficient induced prediction (CIP) on the dequantized transform coefficient of a neighboring block based on the scaling application flag. Furthermore, the present invention may apply a scaling matrix to the dequantized transform coefficient of a target block based on the scaling application flag.

In this case, the scaling matrix may be defined as in Equations 14 and 15.

$$S_1(Q, \Omega, \text{flag1})_{i,j} = \begin{cases} f_1(i, Q_i, \Omega), & i = j, \text{flag1} = 1 \\ 1, & i = j, \text{flag1} = 0 \\ 0, & \text{otherwise,} \end{cases} \quad \text{[Equation 10]}$$

$$S_2(Q, \Omega, \text{flag2})_{i,j} = \begin{cases} f_2(i, Q_i, \Omega), & i = j, \text{flag2} = 1 \\ 1, & i = j, \text{flag2} = 0 \\ 0, & \text{otherwise.} \end{cases} \quad \text{[Equation 11]}$$

FIG. 9 is an embodiment to which the present invention is applied and shows a schematic block diagram of a decoder performing coefficient induced prediction (CIP) using a reference block.

Referring to FIG. 9, the decoder 900 to which the present invention is applied may include an entropy decoding unit 910, a dequantization unit 920, a first coefficient modification unit 930, an inverse-transform unit 940, and a coefficient induced prediction unit 950. Furthermore, the coefficient induced prediction unit 950 may include a dequantization unit 951, a second coefficient modification unit 952, an inverse-transform unit 930, and a prediction unit 934. The contents of FIGS. 7 and 8 may be applied to the function units of the decoder. Furthermore, the operations and characteristics of the aforementioned function units may be applied to the function units of the decoder. Hereinafter, a redundant description is omitted, and only a different portion or portions necessary to supplement each embodiment are described.

Referring to FIG. 9, the decoder further includes an addition unit unlike in FIG. 7. It may be seen that the addition unit uses reference data R. In this case, the reference data R may mean an error signal or a correction signal, but the present invention is not limited thereto. The reference data R may mean a prediction signal, and the prediction signal may be obtained by intra prediction or inter prediction.

The decoder 900 may receive an entropy-encoded signal, may perform entropy decoding on the entropy-encoded signal through the entropy decoding unit 910, and may generate the dequantized transform coefficient of a target block by performing dequantization on the entropy-decoded signal through the dequantization unit 920.

The first coefficient modification unit 930 may generate the modified transform coefficient of the target block by applying a first scaling matrix to the dequantized transform coefficient of the target block. In this case, in order to determine the first scaling matrix, at least one parameter may be used. For example, the at least one parameter may include a training set of (X,Y,Ω) triplets.

Furthermore, the modified transform coefficient of the target block may be decoded by performing inverse-transform through the inverse-transform unit 740. The decoded signal may be added to reference data R to generate a modified decoded signal $\hat{X}$. In this case, the reference data R may mean a prediction signal. For example, the prediction signal may be obtained by intra prediction or inter prediction, but the present invention is not limited thereto. The decoded signal may correspond to a residual signal. In this case, the reference data R may mean an error signal or correction signal for the residual signal.

The above process is represented as Equations 16 and 17 in the form of an equation.

$$\hat{C} = \text{dequantize}(Q), \quad \text{[Equation 16]}$$

$$\hat{X} = R + T^{-1} S_1(Q, \Omega) \hat{C} \quad \text{[Equation 17]}$$

Meanwhile, the embodiments described in this specification may be applied to the coefficient induced prediction unit 950. A process of obtaining the scaling matrix through the coefficient induced prediction unit 950 may be expressed into Equation 18.

$$\tilde{Y} = \text{simple\_predict}(R + T^{-1} S_2(Q, \Omega) \hat{C}) \quad \text{[Equation 18]}$$

In this case, S2 may indicate a second scaling matrix. The second scaling matrix may have a value different from that of the first scaling matrix, but the present invention is not limited thereto. The same matrix may be applied to the two scaling matrices.

The first scaling matrix S1 and the second scaling matrix S2 may be represented as Equations 19 and 20 in the form of an equation.

$$S_1(Q, \Omega)_{i,j} = \begin{cases} f_1(i, Q_i, \Omega), & i = j \\ 0, & \text{otherwise} \end{cases} \quad \text{[Equation 19]}$$

$$S_2(Q, \Omega)_{i,j} = \begin{cases} f_2(i, Q_i, \Omega), & i = j \\ 0, & \text{otherwise} \end{cases} \quad \text{[Equation 20]}$$

In this case, $f(i, Q_i, \Omega)$ indicates the function of indicated parameters, and f may be called a coefficient induced prediction function (CIP function).

In an embodiment of the present invention, the scaling matrices S1 and S2 may be obtained by searching for respective optimal coefficient induced prediction functions (CIP functions). The optimal coefficient induced prediction functions $f_1^*$ and $f_2^*$ may be obtained through Equations 21 and 22. For example, in Equation 21, the first optimal coefficient induced prediction function $f_1^*$ may correspond to a value that minimizes the difference between the target block X and the modified decoded signal $\hat{X}$. In this case, the modified decoded signal $\hat{X}$ is the same as Equation 17.

Furthermore, in Equation 22, the second optimal coefficient induced prediction function $f_2^*$ may correspond to a value that minimizes the difference between a neighboring block Y and the prediction signal $\tilde{Y}$ of the neighboring block. In this case, the prediction signal $\tilde{Y}$ of the neighboring block is the same as Equation 18.

$$f_1^* = \underset{f_1}{\text{argmin}} \sum_{(X,Y,\Omega) \in \psi} \| X - R - T^{-1} S_1(Q, \Omega) \hat{C} \|_2^2 \quad \text{[Equation 21]}$$

$$f_2^* = \underset{f_2}{\text{argmin}} \sum_{(X,Y,\Omega) \in \psi} \| Y - \text{simple\_predict}(R + T^{-1} S_2(Q, \Omega) \hat{C}) \|_2^2. \quad \text{[Equation 22]}$$

FIG. 10 is an embodiment to which the present invention is applied and shows a flowchart of performing encoding using coefficient induced prediction (CIP).

First, the encoder may perform transform on the neighboring block of a target block (S1010).

The encoder may quantize the transform coefficient of the neighboring block (S1020), and may dequantize the quantized transform coefficient (S1030).

The encoder may perform a scaling on the dequantized transform coefficient of the neighboring block using a scaling matrix (S1040).

In this case, the scaling matrix is derived based on a coding parameter. The coding parameter may include at least one of an intra prediction mode, a quantization parameter, or a block size.

Furthermore, the scaling matrix may be determined based on a quantized transform coefficient vector.

In an embodiment of the present invention, a scaling application flag indicating whether or not to perform a scaling on a dequantized transform coefficient may be defined. The scaling application flag may be defined in various levels (e.g., a sequence, a frame, a slice, a coding unit, a prediction unit, and a transform unit), but the present invention is not limited thereto. The scaling application flag may be used in at least one level.

Furthermore, the scaling application flag may be signaled and transmitted to the decoder, but the present invention is not limited thereto. The scaling application flag may be derived based on coding information. For example, the coding information may include at least one of the coding parameters of a current block or a neighboring block, the scaling application flag of the neighboring block, information common to the encoder/decoder, and information corresponding to $\Omega/Q$.

The present invention may perform the aforementioned embodiments of FIGS. 3 to 9 based on the scaling application flag. For example, the present invention may perform coefficient induced prediction (CIP) on the dequantized transform coefficient of a neighboring block based on the scaling application flag. Furthermore, the present invention may apply a scaling matrix to the dequantized transform coefficient of a target block based on the scaling application flag.

The encoder may obtain a modified neighboring block by performing inverse-transform on the scaled transform coefficient (S1050), and may generate a prediction block for the target block based on the modified neighboring block (S1060).

Meanwhile, the encoder may generate a decoded block (S1080) by performing inverse-transform on the dequantized transform coefficient of the target block (S1070).

FIG. 11 is an embodiment to which the present invention is applied and shows a flowchart of performing decoding using coefficient induced prediction (CIP).

First, the decoder may perform entropy decoding on the neighboring block of a target block (S1110), and may perform dequantization on the resulting block (S1120).

The decoder may perform a scaling on the dequantized transform coefficient of the neighboring block using a scaling matrix (S1130).

Furthermore, the decoder may obtain a modified neighboring block by performing inverse-transform on the scaled transform coefficient (S1140), and may generate a prediction block for the target block based on the modified neighboring block (S1150).

Meanwhile, the decoder may generate a decoded block (S1170) by performing inverse-transform on the dequantized transform coefficient of the target block (S1160).

FIG. 12 is an embodiment to which the present invention is applied and is a schematic block diagram of an encoder performing encoding using a coefficient induced reconstruction (CIR).

Referring to FIG. 12, the encoder 1200 to which the present invention is applied may include a transform unit 1210, a quantization unit 1220, an entropy encoding unit 1230, a dequantization unit 1240, an inverse-transform unit 1250 and a coefficient induced prediction unit 1260. Furthermore, the coefficient induced prediction unit 1260 may include a dequantization unit 1261, a modified inverse-transform unit 1262 and a prediction unit 1263.

The operations and characteristics of the above-described function units may be applied to the function units described in the drawings of this specification, and a redundant description thereof is omitted below and only portions necessary to supplement a different portion or each embodiment are described.

First, the encoder 1200 may perform a transform through the transform unit 1210 when the original video signal X is received, and may perform a quantization through the quantization unit 1220. The quantized signal may be transmitted to the decoder through the entropy encoding unit 1230. In this case, the original video signal X may include an 8×8 block of a video frame, for example.

The dequantization unit 1240 and the inverse-transform unit 1250 may generate a decoded signal $\hat{X}$ by dequantizating/inverse-transforming the quantized signal.

Meanwhile, the quantized signal may be transmitted to the coefficient induced prediction unit 1260, and coefficient induced prediction may be performed on the quantized signal.

The coefficient induced prediction unit 1260 may perform a modified inverse-transform on the dequantized transform coefficient vector of a neighboring block, and may perform prediction using a reference pixel generated by the modified inverse-transform. In this case, the modified inverse-transform may mean that a different scaling matrix is applied to each pixel location reconstructed with respect to the dequantized transform coefficient vector of the neighboring block. For example, the row vector of the existing inverse-transform matrix may be multiplied by each different scaling matrix.

For detailed example, the dequantization unit 1261 may calculate a dequantized transform coefficient by performing dequantization on the quantized signal.

Furthermore, the modified inverse-transform unit 1262 may obtain a modified neighboring block by performing a modified inverse-transform on the dequantized transform coefficient vector of the neighboring block. In this case, the modified inverse-transform may be performed using a modified inverse-transform matrix.

Furthermore, the prediction unit 1263 may generate a prediction signal $\tilde{Y}$ based on an inverse-transformed result value. In this case, the prediction signal $\tilde{Y}$ may mean a prediction signal for a neighboring block Y. The prediction signal $\tilde{Y}$ for the neighboring block may be called a modified neighboring block.

The inverse-transformed result value may mean a modified signal having a value different from a decoded signal $\hat{X}$. The modified signal may be represented as $\hat{X}'$, and may be called a changed signal or scaled signal. In this case, the signal may be substituted with a block, frame or pixel.

This is represented as an equation like Equation 23.

$$\tilde{Y} = \text{simple\_predict}(\tilde{T}^{-1}\hat{C}) \quad \text{[Equation 23]}$$

In this case, $\tilde{T}^{-1}$ indicates a modified reconstruction matrix, which may be called a modified inverse-transform matrix. $\tilde{Y}$ means the prediction signal of a neighboring block Y neighboring a target block.

The modified inverse-transform matrix may be determined or derived based on a coding parameter. For example, the coding parameter may include at least one of an intra-prediction mode, an inter-prediction mode, a quantization parameter or a block size. Assuming that the coding parameter is obtained as a vector $\Omega$, the modified inverse-transform matrix may be represented as a function of $\Omega$, that is, $\tilde{T}^{-1}(\Omega)$ In an embodiment of the present invention, the modified inverse-transform matrix $\tilde{T}^{-1}$ may be represented as a function of Q like Equation 24. The modified inverse-transform matrix $\tilde{T}^{-1}(Q, \Omega)$ may be determined based on at least one of Q or $\Omega$.

$$\tilde{T}^{-1}(Q,\Omega)_{i,j} = f(i,j,Q_j,\Omega) \quad \text{[Equation 24]}$$

In this case, $f(i,j,Q_j,\Omega)$ indicates a function of indicated parameters, and f may be called a coefficient induced reconstruction function (CIR function).

In an embodiment of the present invention, the modified inverse-transform matrix is determined based on a coefficient induced reconstruction function. The coefficient induced reconstruction function may include the row component of the modified inverse-transform matrix and a scaling matrix component corresponding to the row component.

In an embodiment of the present invention, the scaling matrix component corresponding to the row component may be determined based on at least one of the column component of the modified inverse-transform matrix, a quantized transform coefficient vector corresponding to the column component or a coding parameter. In this case, the column component may mean an index indicating the column component, but the present invention is not interpreted as being limited thereto.

For example, if the i-th row of a modified inverse-transform matrix $\tilde{T}^{-1}$ is indicated as $t_i$, the coefficient induced reconstruction function $f$ may be represented like Equation 25.

$$f(i,j,Q_j,\Omega) = t_i(j) \cdot s^i(j,Q_j,\Omega), \quad \text{[Equation 25]}$$

In this case, $s^i(j, Q_1, \Omega)$ indicates a scaling matrix $S^i$ corresponding to the i-th row (e.g., i-th reconstruction base) of a modified inverse-transform matrix $T^{-1}$. The scaling matrix $S^i$ may be defined like Equation 26.

$$S^i_{k,l} = \begin{cases} s^i(k, Q_k, \Omega), & k = l \\ 0, & k \neq l \end{cases} \quad \text{[Equation 26]}$$

That is, the i-th row $\tilde{t}_i$ of the modified inverse-transform matrix $\tilde{T}^{-1}$ may be represented like Equation 27 again.

$$\tilde{t}_i = t_i \cdot S^i. \quad \text{[Equation 27]}$$

In the above embodiments, the scaling matrix does not depend on i, that is, the row of an inverse-transform matrix. In the present embodiment, however, a variation in an quantization error occurring due to a dequantized transform coefficient $\hat{C}(j)$ can be accommodated by properly scaling its contribution to the reconstruction of an i-th pixel. That is, since the influence of a quantization error occurring in each transform coefficient $\hat{C}(j)$ may differently act on each pixel location, the reconstruction of the i-th pixel can be better performed by properly scaling $\hat{C}(j)$ based on a pixel location i (by differently scaling $\hat{C}(j)$ based on a pixel location). For example, if an i-th pixel value is greatly distorted due to a quantization error in $\hat{C}(j)$, the degree that the i-th pixel value is distorted can be reduced by reducing the contribution of $\hat{C}(j)$. In this case, the contribution may be increased by multiplying it by a scaling value having a large absolute value, and may be decreased by multiplying it by a scaling value having a small absolute value.

FIG. 13 is an embodiment to which the present invention is applied and is a schematic block diagram of a decoder performing decoding using a coefficient induced reconstruction (CIR).

Referring to FIG. 13, the decoder 1300 to which the present invention is applied may include an entropy-decoding unit 1310, a dequantization unit 1320, an inverse-transform unit 1330 and a coefficient induced prediction unit 1340. Furthermore, the coefficient induced prediction unit 1340 may include a dequantization unit 1341, a modified inverse-transform unit 1342 and a prediction unit 1343.

The operations and characteristics of the above-described function units may be applied to the function units described in the drawings of this specification, and a redundant description thereof is omitted below and only portions necessary to supplement a different portion or each embodiment are described.

The decoder 1300 may receive an entropy-encoded signal, may perform an entropy-decoding on the entropy-encoded signal through the entropy-decoding unit 1310, and may perform a dequantization/inverse-transform through the dequantization unit 1320/inverse-transform unit 1330.

Meanwhile, the entropy-decoded signal may be transmitted to the coefficient induced prediction unit 1340, and coefficient induced prediction may be performed on the entropy-decoded signal.

For example, the coefficient induced prediction unit 1340 may perform a modified inverse-transform on the dequantized transform coefficient vector of a neighboring block, and may perform prediction using a reference pixel generated by the modified inverse-transform. In this case, the modified inverse-transform may mean that a different scaling matrix is applied to each pixel location reconstructed with respect to the dequantized transform coefficient vector of the neighboring block. For example, the row vector of the existing inverse-transform matrix may be multiplied by each different scaling matrix.

For detailed example, the dequantization unit 1341 may calculate a dequantized transform coefficient by performing dequantization on the quantized signal.

Furthermore, the modified inverse-transform unit 1342 may obtain a modified neighboring block by performing a modified inverse-transform on the dequantized transform coefficient vector of the neighboring block. In this case, the modified inverse-transform may be performed using a modified inverse-transform matrix.

The function units within the coefficient induced prediction unit 1340 may operate identically with or similar to the coefficient induced prediction unit 1260 of the encoder, and a redundant description thereof is omitted below.

FIG. 14 is an embodiment to which the present invention is applied and is a schematic block diagram of a decoder for illustrating a method of determining a modified inverse-transform matrix when decoding is performed using a coefficient induced reconstruction (CIR).

Referring to FIG. 14, the decoder 1400 to which the present invention is applied may include an entropy-decoding unit 1410, a dequantization unit 1420, an inverse-transform unit 1430 and a coefficient induced prediction unit 1440. Furthermore, the coefficient induced prediction unit 1440 may include a dequantization unit 1441, a modified inverse-transform unit 1442 and a prediction unit 1443.

The operations and characteristics of the above-described function units may be applied to the function units described in the drawings of this specification, and a redundant description thereof is omitted below and only portions necessary to supplement a different portion or each embodiment are described.

The decoder 1400 may receive an entropy-encoded signal and perform an entropy-decoding on the entropy-encoded signal through the entropy-decoding unit 1410. A dequantization/inverse-transform may be performed on the entropy-decoded signal through the dequantization unit 1420/inverse-transform unit 1430.

Furthermore, the entropy-decoded signal may be transmitted to the coefficient induced prediction unit 1440, and a coefficient induced reconstruction (or coefficient induced prediction) may be performed on the entropy-decoded signal.

The coefficient induced prediction unit 1440 may perform a modified inverse-transform on the dequantized transform coefficient vector of a neighboring block, and may perform prediction using a reference pixel generated by the modified inverse-transform. In this case, the modified inverse-transform may mean that a different scaling matrix is applied to each pixel location reconstructed with respect to the dequantized transform coefficient vector of the neighboring block. For example, the row vector of the existing inverse-transform matrix may be multiplied by each different scaling matrix.

For detailed example, the dequantization unit 1441 may calculate a dequantized transform coefficient by performing dequantization on the quantized signal.

Furthermore, the modified inverse-transform unit 1442 may obtain a modified neighboring block by performing a modified inverse-transform on the dequantized transform coefficient vector of the neighboring block. In this case, the modified inverse-transform may be performed using a modified inverse-transform matrix.

In one embodiment, the modified inverse-transform matrix is determined based on a coefficient induced reconstruction function. The coefficient induced reconstruction function may include the row component of the modified inverse-transform matrix and a scaling matrix component corresponding to the row component.

In one embodiment, the coefficient induced reconstruction function may be determined to minimize a difference between the neighboring block and the modified neighboring block.

For example, it is assumed that $\psi$ is a training set of $(X,Y,\Omega)$ triplets. The modified inverse-transform matrix may be obtained by finding out an optimal coefficient induced reconstruction function (CIR function). The optimal coefficient induced reconstruction function may be found out through Equation 28. For example, the optimal coefficient induced reconstruction function may correspond to a value to minimize a difference between a neighboring block Y and the prediction signal $\tilde{Y}$ of the neighboring block.

$$f^* = \underset{f}{\operatorname{argmin}} \sum_{(X,Y,\Omega) \in \psi} \left\| Y - \text{simple\_predic}\left(\tilde{T}^{-1}(Q,\Omega)\hat{C}\right) \right\|_2^2 \quad \text{[Equation 28]}$$

In this case, $\tilde{T}^{-1}(Q,\Omega)$ may be defined as a function according to Equation 24 as described above.

FIG. 15 is an embodiment to which the present invention is applied and is a schematic block diagram of a decoder performing decoding a coefficient induced reconstruction (CIR) for a neighboring block and a modified inverse-transform for a target block.

In an embodiment of the present invention, better prediction can be performed by performing a coefficient induced reconstruction on the dequantized transform coefficient of a neighboring block and also performing a coefficient induced reconstruction on the dequantized transform coefficient of a target block.

Referring to FIG. 15, the decoder 1500 to which the present invention is applied may include an entropy-decoding unit 1510, a dequantization unit 1520, a first modified inverse-transform unit 1530 and a coefficient induced prediction unit 1550. Furthermore, the coefficient induced prediction unit 1550 may include a dequantization unit 1551, a second modified inverse-transform unit 1552 and a prediction unit 1553.

The operations and characteristics of the above-described function units may be applied to the function units described in the drawings of this specification, and a redundant description thereof is omitted below and only portions necessary to supplement a different portion or each embodiment are described.

First, the decoder 1500 may receive an entropy-encoded signal, may perform an entropy-decoding on the entropy-encoded signal through the entropy-decoding unit 1510, and may generate a dequantized transform coefficient for a target block by performing dequantization through the dequantization unit 1520.

The first modified inverse-transform unit 1530 may perform a modified inverse-transform on the dequantized transform coefficient of the target block, and outputs a modified decoded signal $\hat{X}$. In this case, the modified inverse-transform may mean that a different scaling matrix is applied to each pixel location reconstructed with respect to the dequantized transform coefficient vector of the target block.

Such a process is represented as equations like Equations 29 to 30.

$$\hat{C}=\text{dequantize}(Q) \quad [\text{Equation 29}]$$

$$\hat{X}=\tilde{T}_1^{-1}(Q,\Omega)\hat{C} \quad [\text{Equation 30}]$$

In this case, $\tilde{T}^{-1}(Q,\Omega)$ indicates a modified inverse-transform and may be defined as a function according to Equation 24. $\hat{X}$ indicates a modified decoded signal.

Meanwhile, the contents described in FIG. 14 may be applied to the dequantization unit 1551, the second modified inverse-transform unit 1552 and the prediction unit 1553 within the coefficient induced prediction unit 1550. The modified inverse-transform matrix used in the second modified inverse-transform unit 1552 may be called a second modified inverse-transform matrix.

A process obtained through the coefficient induced prediction unit 1550 may be represented as Equation 31.

$$\tilde{Y}=\text{simple\_predict}(\tilde{T}_2^{-1}(Q,\Omega)\hat{C}) \quad [\text{Equation 31}]$$

In this case, $\tilde{T}_2^{-1}(Q,\Omega)$ may indicate the second modified inverse-transform matrix.

In an embodiment of the present invention, the first modified inverse-transform matrix and the second modified inverse-transform matrix may have different values. However, the present invention is not limited thereto, and the same matrix may be applied to the two modified inverse-transform matrices.

The first modified inverse-transform matrix $\tilde{T}_1^{-1}(Q,\Omega)$ and the second modified inverse-transform matrix $\tilde{T}_2^{-1}(Q,\Omega)$ may be represented as equations like Equation 32 to 33.

$$\tilde{T}_1^{-1}(Q,\Omega)_{i,j}=f_1(i,j,Q_j,\Omega) \quad [\text{Equation 32}]$$

$$\tilde{T}_2^{-1}(Q,\Omega)_{i,j}=f_2(i,j,Q_j,\Omega) \quad [\text{Equation 33}]$$

In this case, f1(i,j,Qj,Ω) and f2(i,j,Qj,Ω) indicate coefficient induced reconstruction functions for a target block and a neighboring block, respectively.

In one embodiment, an optimal coefficient induced reconstruction function for a neighboring block may be determined to minimize a difference between the neighboring block and a modified neighboring block.

Furthermore, an optimal coefficient induced reconstruction function for a target block may be determined to minimize a difference between the target block and a modified target block.

In an embodiment of the present invention, the first modified inverse-transform matrix and the second modified inverse-transform matrix may be obtained by finding out optimal coefficient induced reconstruction functions (CIR functions), respectively. Optimal coefficient induced reconstruction functions $f_1^*$ and $f_2^*$ may be found through Equations 34 to 35. For example, referring to Equation 34, the first optimal coefficient induced reconstruction function $f_1^*$ may correspond to a value to minimize a difference between a target block X and a modified decoded signal $\hat{X}$. Furthermore, referring to Equation 35, the second optimal coefficient induced reconstruction function $f_2^*$ may correspond to a value to minimize a difference between a neighboring block Y and the prediction signal $\tilde{Y}$ of the neighboring block.

$$f_1^* = \operatorname*{argmin}_{f_1} \sum\nolimits_{(X,Y,\Omega)\in\psi} \left\| X - \tilde{T}_1^{-1}(Q,\Omega)\hat{C} \right\|_2^2 \quad [\text{Equation 34}]$$

$$f_2^* = \operatorname*{argmin}_{f_2} \sum\nolimits_{(X,Y,\Omega)\in\psi} \left\| Y - \text{simple\_predict}(\tilde{T}_2^{-1}(Q,\Omega)\hat{C}) \right\|_2^2 \quad [\text{Equation 35}]$$

In this case, ψ indicates a training set of (X,Y,Ω) triplets.

FIG. 16 is an embodiment to which the present invention is applied and is a schematic block diagram of a decoder performing decoding using at least one modified scaling application flag indicating whether a modified inverse-transform is applied to the dequantized transform coefficient of a target block and/or a neighboring block.

Referring to FIG. 16, the decoder 1600 to which the present invention is applied may include an entropy-decoding unit 1610, a dequantization unit 1620, a first modified inverse-transform unit 1630 and a coefficient induced prediction unit 1650. Furthermore, the coefficient induced prediction unit 1650 may include a dequantization unit 1651, a second modified inverse-transform unit 1652 and a prediction unit 1653. The contents of FIG. 15 may be applied to the function units. Furthermore, the operations and characteristics of the above-described function units may be applied to the function units, and a redundant description thereof is omitted below and only portions necessary to supplement a different portion or each embodiment are described.

The present invention defines a modified scaling application flag indicating whether a modified inverse-transform is applied. For example, a flag indicating whether a modified inverse-transform is applied to a target block may be called a first modified scaling application flag or a modified target scaling application flag. Furthermore, a flag indicating whether a modified inverse-transform is applied to a neighboring block may be called a second modified scaling application flag or a modified neighbor scaling application flag.

The modified scaling application flag may be defined in various levels (e.g., a sequence, a frame, a slice, a coding unit, a prediction unit and a transform unit). However, the present invention is not limited thereto, and the modified scaling application flag may be used in at least one level.

Furthermore, the modified scaling application flag may be signaled and transmitted to a decoder, but the present invention is not limited thereto. The scaling application flag may be derived based on coding information. For example, the coding information may include at least one of the coding parameter of a current block or neighboring block, information common to an encoder/decoder, or information corresponding to Ω/Q.

The present invention may perform the above-described embodiments of FIGS. 12 to 15 based on a modified scaling application flag.

For example, the present invention may perform a coefficient induced reconstruction (CIR) on the dequantized transform coefficient of a neighboring block based on a modified scaling application flag. Furthermore, the present invention may apply a modified inverse-transform matrix to the dequantized transform coefficient of a target block based on a modified scaling application flag.

In this case, the modified inverse-transform matrix may be defined like Equations 36 to 37.

$$\tilde{T}_1^{-1}(Q, \Omega, \text{flag1})_{i,j} = \begin{cases} f_1(i, j, Q_j, \Omega), & \text{flag1} = 1 \\ T_{ij}^{-1}, & \text{flag1} = 0 \end{cases} \quad \text{[Equation 36]}$$

$$\tilde{T}_2^{-1}(Q, \Omega, \text{flag2})_{i,j} = \begin{cases} f_2(i, j, Q_j, \Omega), & \text{flag2} = 1 \\ T_{ij}^{-1}, & \text{flag2} = 0 \end{cases} \quad \text{[Equation 37]}$$

In this case, $T^{-1}$ indicates a default transform.

FIG. 17 is an embodiment to which the present invention is applied and is a schematic block diagram of a decoder performing a coefficient induced reconstruction (CIR) using a reference block.

Referring to FIG. 17, the decoder 1700 to which the present invention is applied may include an entropy-decoding unit 1710, a dequantization unit 1720, a first modified inverse-transform unit 1730 and a coefficient induced prediction unit 1750. Furthermore, the coefficient induced prediction unit 1750 may include a dequantization unit 1751, a second modified inverse-transform unit 1752 and a prediction unit 1753. The contents of FIGS. 15 and 16 may be applied to the function units. Furthermore, the operations and characteristics of the above-described function units may be applied to the function units, and a redundant description thereof is omitted below and only portions necessary to supplement a different portion or each embodiment are described.

Referring to FIG. 17, it may be seen that addition units are further included unlike in FIG. 15 and the addition unit uses reference data R. In this case, the reference data R may mean an error signal or a correction signal, but the present invention is not limited thereto. The reference data R may mean a prediction signal. The prediction signal may be obtained by intra-prediction, or inter-prediction.

The decoder 1700 may receive an entropy-encoded signal, may perform an entropy-decoding through the entropy-decoding unit 1710, and may generate a dequantized transform coefficient for a target block by performing dequantization through the dequantization unit 1720.

The first modified inverse-transform unit 1730 performs a modified inverse-transform on the dequantized transform coefficient of the target block, and outputs a decoded signal. In this case, the modified inverse-transform may mean that a different scaling matrix is applied to each pixel location reconstructed with respect to the dequantized transform coefficient vector of the target block.

In this case, at least one parameter may be used to determine the first modified inverse-transform matrix. For example, the at least one parameter may include a training set of (X,Y,Ω) triplets.

The decoded signal may be added to reference data R to generate a modified decoded signal $\hat{X}$. In this case, the reference data R may mean a prediction signal. For example, the prediction signal may be obtained by intra-prediction or inter-prediction, but the present invention is not limited thereto. The decoded signal may correspond to a residual signal. In this case, the reference data R may mean an error signal or correction signal for the residual signal.

The above process is represented as equations like Equations 38 to 39.

$$\hat{C} = \text{dequantize}(Q), \quad \text{[Equation 38]}$$

$$\hat{X} = R + \tilde{T}_1^{-1}(Q,\Omega)\hat{C}, \quad \text{[Equation 39]}$$

Meanwhile, the embodiments described in this specification may be applied to the coefficient induced prediction unit 1750. A process of obtaining the modified inverse-transform matrix through the coefficient induced prediction unit 1750 may be represented as Equation 40.

$$\hat{Y} = \text{simple\_predict}(R + \tilde{T}_2^{-1}(Q,\Omega)\hat{C}). \quad \text{[Equation 40]}$$

In this case, $\tilde{T}_2^{-1}(Q,\Omega)$ may indicate a second modified inverse-transform matrix. The second modified inverse-transform matrix may have a value different from that of the first modified inverse-transform matrix, but the present invention is not limited thereto. The same matrix may be applied to the two modified inverse-transform matrices.

The first modified inverse-transform matrix $\tilde{T}_1^{-1}(Q,\Omega)$ and the second modified inverse-transform matrix $\tilde{T}_2^{-1}(Q,\Omega)$ are represented as equations like Equations 41 to 42.

$$\tilde{T}_1^{-1}(Q,\Omega)_{i,j} = f_1(i,j,Q_j,\Omega) \quad \text{[Equation 41]}$$

$$\tilde{T}_2^{-1}(Q,\Omega)_{i,j} = f_2(i,j,Q_j,\Omega) \quad \text{[Equation 42]}$$

In an embodiment of the present invention, the first modified inverse-transform matrix $\tilde{T}_1^{-1}(Q,\Omega)$ and the second modified inverse-transform matrix $\tilde{T}_2^{-1}(Q,\Omega)$ may be obtained by finding out respective optimal coefficient induced reconstruction functions. The optimal coefficient induced reconstruction functions $f_1^*$ and $f_2^*$ may be found through Equations 43 to 44. For example, referring to Equation 43, the first optimal coefficient induced reconstruction function $f_1^*$ may correspond to a value to minimize a difference between a target block X and a modified decoded signal $\hat{X}$. In this case, the modified decoded signal $\hat{X}$ is the same as Equation 36.

Furthermore, referring to Equation 44, the second optimal coefficient induced prediction function $f_2^*$ may correspond to a value to minimize a difference between a neighboring block Y and the prediction signal $\hat{Y}$ of a neighboring block. In this case, the prediction signal $\hat{Y}$ of the neighboring block is the same as Equation 37.

$$f_1^* = \underset{f_1}{\text{argmin}} \sum_{(X,Y,\Omega) \in \psi} \left\| X - R - \tilde{T}_1^{-1}(Q,\Omega)\hat{C} \right\|_2^2 \quad \text{[Equation 40]}$$

$$f_2^* = \underset{f_2}{\text{argmin}} \sum_{(X,Y,\Omega) \in \psi} \left\| Y - \text{simple\_predict}(R + \tilde{T}_2^{-1}(Q,\Omega)\hat{C}) \right\|_2^2 \quad \text{[Equation 41]}$$

FIG. 18 is an embodiment to which the present invention is applied and shows a flowchart performing encoding using a coefficient induced reconstruction (CIR) for a neighboring block.

First, the encoder may perform a transform on the neighboring block of a target block (S1810).

The encoder may quantize a transform coefficient vector for the neighboring block (S1820), and may dequantize the quantized transform coefficient vector (S1830).

The encoder may obtain a modified neighboring block by performing a modified inverse-transform on the dequantized transform coefficient vector of the neighboring block (S1840).

The encoder may generate a prediction block for the target block based on the modified neighboring block (S1850).

Meanwhile, the encoder may generate a decoded block (S1870) by performing an inverse-transform on the dequantized transform coefficient vector of the target block (S1860).

FIG. 19 is an embodiment to which the present invention is applied and shows a flowchart performing decoding using a coefficient induced reconstruction (CIR) for a neighboring block.

First, the decoder may perform an entropy-decoding on the neighboring block of a target block (S1910), and may perform dequantization on the entropy-decoded neighboring block (S1920).

The decoder may obtain a modified neighboring block by performing a modified inverse-transform on the dequantized transform coefficient vector of the neighboring block (S1930).

Furthermore, the decoder may generate a prediction block for the target block based on the modified neighboring block (S1940).

Meanwhile, the decoder may generate a decoded block (S1960) by performing an inverse-transform on the dequantized transform coefficient vector of the target block (S1950).

As described above, the embodiments described in the present invention may be implemented on a processor, a microprocessor, a controller or a chip and performed. For example, the function units shown in FIGS. 1 to 9 and 12 to 17 may be implemented on a computer, a processor, a microprocessor, a controller or a chip and performed.

As described above, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional 3D video apparatus, a teleconference video apparatus, and a medical video apparatus and may be used to code video signals and data signals.

Furthermore, the decoding/encoding method to which the present invention is applied may be produced in the form of a program to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves, e.g., transmission through the Internet. Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method of performing an enhanced prediction on video signals, comprising:
   performing, by a processor, an entropy-decoding on the video signals including a target block and a neighbor block neighboring the target block to obtain an entropy-decoded target block and an entropy-decoded neighbor block;
   performing, by the processor, a dequantization on the entropy-decoded target block and the entropy-decoded neighbor block;
   performing, by the processor, an inverse-transform on a dequantized transform coefficient vector of the target block;
   obtaining, by the processor, a modified neighboring block by performing a modified inverse-transform on a dequantized transform coefficient vector of the neighbor block; and
   generating, by the processor, a prediction block for the target block based on the modified neighboring block,
   wherein based on the modified inverse-transform being performed, a different scaling matrix is applied to each pixel location reconstructed with respect to the dequantized transform coefficient vector of the neighbor block,
   wherein the modified inverse-transform is performed using a modified inverse-transform matrix,
   wherein the modified inverse-transform matrix is determined based on a coefficient induced reconstruction function, and
   wherein the coefficient induced reconstruction function comprises a row component of the modified inverse-transform matrix and a scaling matrix component corresponding to the row component.

2. The method of claim 1,
   wherein the modified inverse-transform matrix is derived based on a coding parameter, and
   wherein the coding parameter comprises at least one of an intra-prediction mode, an inter-prediction mode, a quantization parameter, or a block size.

3. The method of claim 1,
   wherein the modified inverse-transform matrix is determined based on a quantized transform coefficient vector.

4. The method of claim 1,
   wherein the scaling matrix component corresponding to the row component is determined based on at least one of a column component of the modified inverse-transform matrix, a quantized transform coefficient vector corresponding to the column component, or a coding parameter.

5. The method of claim 1,
wherein the coefficient induced reconstruction function is determined to minimize a difference between the neighbor block and the modified neighboring block.

6. The method of claim 1, further comprising
extracting, by the processor, a modified scaling application flag from the video signal,
wherein the modified scaling application flag indicates whether the modified inverse-transform is applied.

7. The method of claim 1, further comprising
deriving, by the processor, a modified scaling application flag from the video signal,
wherein the modified scaling application flag is derived based on at least one of coding information of the neighbor block or a modified scaling application flag of the neighbor block.

8. A method of performing an enhanced prediction on a video signal, the method comprising:
performing, by a processor, a transform on a target block and a neighbor block of the target block;
quantizing, by the processor, transform coefficients for the target block and the neighbor block;
dequantizing, by the processor, the quantized transform coefficients of the target block and the neighbor block;
performing, by the processor, an inverse-transform on a dequantized transform coefficient vector of the target block;
obtaining, by the processor, a modified neighboring block by performing a modified inverse-transform on a dequantized transform coefficient vector of the neighbor block; and
generating, by the processor, a prediction block for the target block based on the modified neighboring block,
wherein based on the modified inverse-transform being performed, a different scaling matrix is applied to each pixel location reconstructed with respect to the dequantized transform coefficient vector of the neighbor block,
wherein the modified inverse-transform is performed using a modified inverse-transform matrix,
wherein the modified inverse-transform matrix is determined based on a coefficient induced reconstruction function, and
wherein the coefficient induced reconstruction function comprises a row component of the modified inverse-transform matrix and a scaling matrix component corresponding to the row component.

9. The method of claim 8,
wherein the modified inverse-transform matrix is derived based on a coding parameter, and
wherein the coding parameter comprises at least one of an intra-prediction mode, an inter-prediction mode, a quantization parameter, or a block size.

10. The method of claim 8,
wherein the modified inverse-transform matrix is determined based on a quantized transform coefficient vector.

11. The method of claim 8,
wherein the scaling matrix component corresponding to the row component is determined based on at least one of a column component of the modified inverse-transform matrix, a quantized transform coefficient vector corresponding to the column component, or a coding parameter.

12. An apparatus configured to perform an enhanced prediction on video signals, the apparatus comprising:
a processor configured to:
perform an entropy-decoding on the video signals including a target block and a neighbor block neighboring the target block to obtain an entropy-decoded target block and an entropy-decoded neighbor block;
perform a dequantization on the entropy-decoded target block and the entropy-decoded neighbor block;
perform an inverse-transform on a dequantized transform coefficient vector of the target block;
obtain a modified neighboring block by performing a modified inverse-transform on a dequantized transform coefficient vector of the neighbor block; and
generate a prediction block for the target block based on the modified neighboring block,
wherein based on the modified inverse-transform being performed, a different scaling matrix is applied to each pixel location reconstructed with respect to the dequantized transform coefficient vector of the neighbor block,
wherein the modified inverse-transform is performed using a modified inverse-transform matrix,
wherein the modified inverse-transform matrix is determined based on a coefficient induced reconstruction function, and
wherein the coefficient induced reconstruction function comprises a row component of the modified inverse-transform matrix and a scaling matrix component corresponding to the row component.

13. The apparatus of claim 12,
wherein the modified inverse-transform matrix is derived based on a coding parameter, and
wherein the coding parameter comprises at least one of an intra-prediction mode, an inter-prediction mode, a quantization parameter, or a block size.

14. The apparatus of claim 12,
wherein the modified inverse-transform matrix is determined based on a quantized transform coefficient vector.

15. The apparatus of claim 12,
wherein the scaling matrix component corresponding to the row component is determined based on at least one of a column component of the modified inverse-transform matrix, a quantized transform coefficient vector corresponding to the column component, or a coding parameter.

16. The apparatus of claim 12,
wherein the coefficient induced reconstruction function is determined to minimize a difference between the neighbor block and the modified neighboring block.

17. The apparatus of claim 12, wherein the processor is further configured to:
extract a modified scaling application flag from the video signal,
wherein the modified scaling application flag indicates whether the modified inverse-transform is applied.

18. The apparatus of claim 12, wherein the processor is further configured to:
derive a modified scaling application flag from the video signal,
wherein the modified scaling application flag is derived based on at least one of coding information of the neighbor block or a modified scaling application flag of the neighbor block.

19. An apparatus configured to perform an enhanced prediction on a video signal, the apparatus comprising:
a processor configured to:
perform a transform on a target block and a neighbor block of the target block;

quantize transform coefficients for the target block and the neighbor block;

dequantize the quantized transform coefficients of the target block and the neighbor block;

perform an inverse-transform on a dequantized transform coefficient vector of the target block;

obtain a modified neighboring block by performing a modified inverse-transform on a dequantized transform coefficient vector of the neighbor block; and generate a prediction block for the target block based on the modified neighboring block, wherein based on the modified inverse-transform being performed, a different scaling matrix is applied to each pixel location reconstructed with respect to the dequantized transform coefficient vector of the neighbor block, wherein the modified inverse-transform is performed using a modified inverse-transform matrix, wherein the modified inverse-transform matrix is determined based on a coefficient induced reconstruction function, and wherein the coefficient induced reconstruction function comprises a row component of the modified inverse-transform matrix and a scaling matrix component corresponding to the row component.

20. The apparatus of claim 19, wherein the modified inverse-transform matrix is derived based on a coding parameter, and wherein the coding parameter comprises at least one of an intra-prediction mode, an inter-prediction mode, a quantization parameter, or a block size.

\* \* \* \* \*